US012681180B2

(12) United States Patent
Takei

(10) Patent No.: US 12,681,180 B2
(45) Date of Patent: Jul. 14, 2026

(54) MONITORING DEVICE, MONITORING SYSTEM, MONITORING METHOD, AND RECORDING MEDIUM

(71) Applicant: NEC Corporation, Tokyo (JP)

(72) Inventor: Daisuke Takei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1003 days.

(21) Appl. No.: 17/800,167

(22) PCT Filed: Jan. 22, 2021

(86) PCT No.: PCT/JP2021/002241
§ 371 (c)(1),
(2) Date: Aug. 16, 2022

(87) PCT Pub. No.: WO2021/176878
PCT Pub. Date: Sep. 10, 2021

(65) Prior Publication Data
US 2023/0076307 A1 Mar. 9, 2023

(30) Foreign Application Priority Data
Mar. 4, 2020 (JP) ................................. 2020-036329

(51) Int. Cl.
*G01S 17/88* (2006.01)
*B61L 23/04* (2006.01)
*G01S 7/4865* (2020.01)

(52) U.S. Cl.
CPC .............. *G01S 17/88* (2013.01); *B61L 23/04* (2013.01); *G01S 7/4865* (2013.01)

(58) Field of Classification Search
None
See application file for complete search history.

(56) References Cited

U.S. PATENT DOCUMENTS

2018/0218288 A1* 8/2018 Liu ........................ G16H 50/20
2019/0096109 A1* 3/2019 Oshikiri ................... G06T 7/73
(Continued)

FOREIGN PATENT DOCUMENTS

JP H10-063335 A 3/1998
JP 2002-257744 A 9/2002
(Continued)

OTHER PUBLICATIONS

Özaslan, Tolga, et al. "Towards fully autonomous visual inspection of dark featureless dam penstocks using MAVs." 2016 IEEE/RSJ International Conference on Intelligent Robots and Systems (IROS). IEEE, 2016. (Year: 2016).*
(Continued)

*Primary Examiner* — Luke D Ratcliffe
(74) *Attorney, Agent, or Firm* — Sughrue Mion, PLLC

(57) ABSTRACT

A monitoring device includes a progress execution unit that causes a combination of an irradiation unit and a light reception unit to progress inside a space that is tubular inside, the irradiation unit being for irradiating, with laser light, an exposed object that is an object exposed in the space of a tubular object being an object having the space, the light reception unit converting return light of the laser light from the exposed object into an electric signal; and a section specification unit that specifies, based on the electric signal, a predetermined-state section position being a position of a predetermined-state section that is, among sections of the exposed object that are irradiated with the laser light, the section indicating a predetermined state, and outputs the resultant.

20 Claims, 15 Drawing Sheets

(56)     References Cited

U.S. PATENT DOCUMENTS

| 2020/0218288 A1* | 7/2020 | Johnson | B64U 30/26 |
| 2021/0150692 A1* | 5/2021 | Dickman | G06F 18/2148 |
| 2021/0310597 A1* | 10/2021 | Takashima | B62D 57/028 |

FOREIGN PATENT DOCUMENTS

| JP | 2004-251804 A | 9/2004 |
| JP | 2006-234383 A | 9/2006 |
| JP | 2007-010335 A | 1/2007 |
| JP | 2011-069747 A | 4/2011 |
| JP | 2015-175611 A | 10/2015 |
| JP | 2017-044657 A | 3/2017 |
| JP | 2017-129508 A | 7/2017 |
| JP | 2019-109136 A | 7/2019 |
| JP | 2019-120629 A | 7/2019 |
| JP | 2019-139657 A | 8/2019 |

OTHER PUBLICATIONS

JP Official Communication for JP Application No. 2022-505022, mailed on Mar. 27, 2024 with English Translation.

JP Office Communication for JP Application No. 2022-505022, mailed on Oct. 3, 2023 with English Translation.

JP Office Action for JP Application No. 2022-505022, mailed on Mar. 25, 2025 with English Translation.

International Search Report for PCT Application No. PCT/JP2021/002241, mailed on Apr. 13, 2021.

English translation of Written opinion for PCT Application No. PCT/JP2021/002241, mailed on Apr. 13, 2021.

\* cited by examiner

ACQUISITION UNIT 130

ACQUISITION STRUCTURE UNIT 138

ACQUISITION PROCESSING UNIT

136

CONNECTED TO PROCESSING UNIT 140
AND STORAGE UNIT 150

Fig.3A    ACQUISITION
STRUCTURE UNIT 138
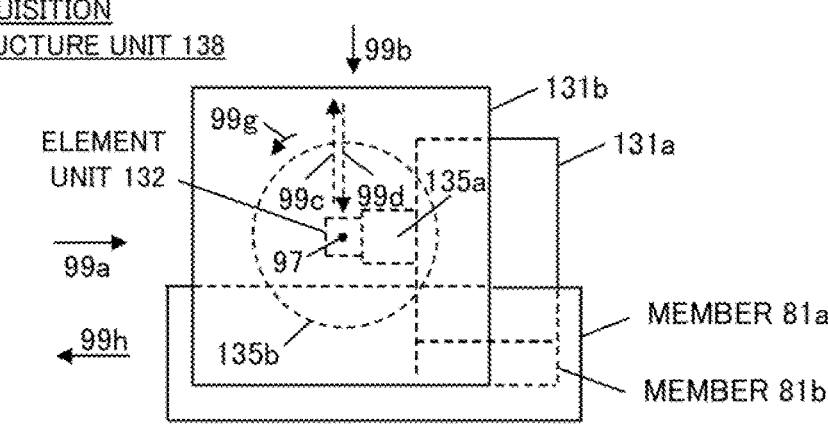
Fig.3B    ACQUISITION
STRUCTURE UNIT 138
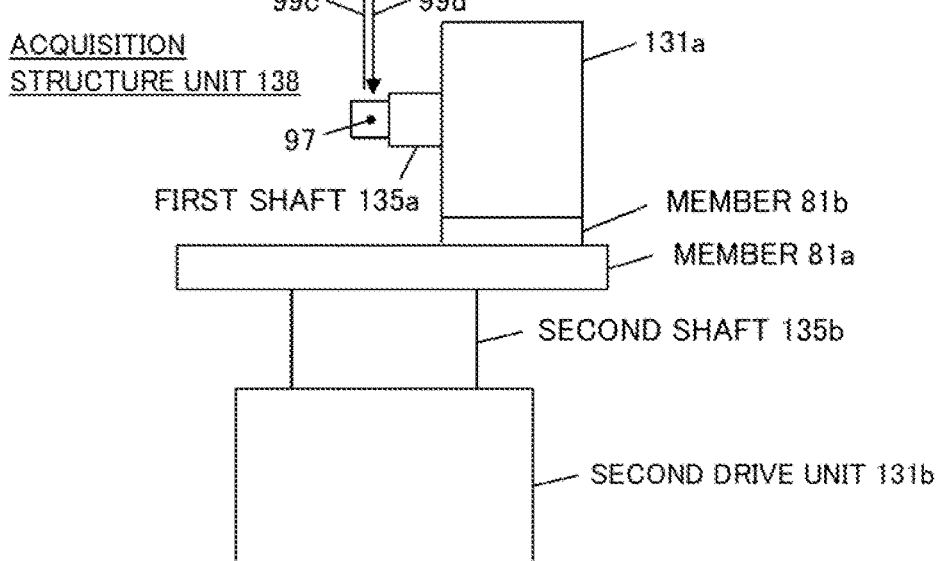
Fig.3C    ACQUISITION
STRUCTURE UNIT 138
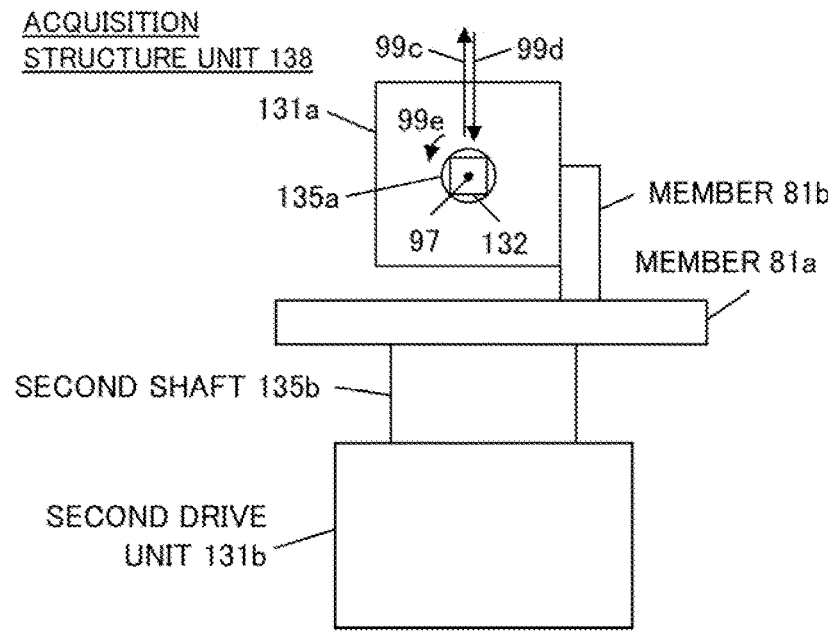

Fig.4

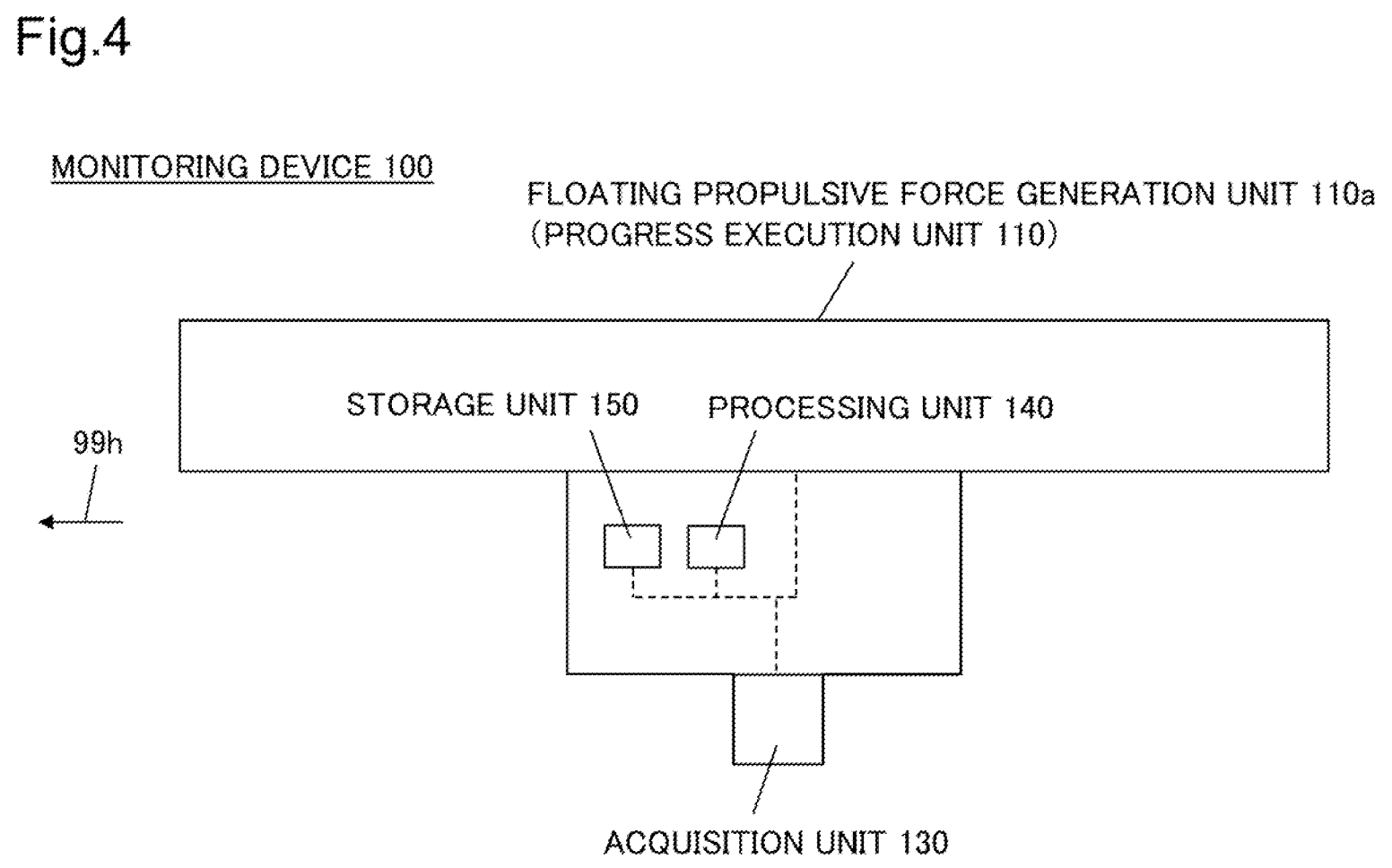

MONITORING DEVICE 100

FLOATING PROPULSIVE FORCE GENERATION UNIT 110a
(PROGRESS EXECUTION UNIT 110)

PROCESSING UNIT 140

STORAGE UNIT 150

ACQUISITION UNIT 130

99h

MONITORING DEVICE 100

PROGRESS EXECUTION UNIT 110

PROCESSING DEVICE 140b

PROGRESS EXECUTION ROPE 110b

99h

COMMUNICATION UNIT 170

ROPE DRIVING DEVICE 110c

SUSPENDED UNIT 180

STORAGE UNIT 150a

PROCESSING UNIT 140a

SUSPENDED UNIT 180

COMMUNICATION UNIT 170

ACQUISITION UNIT 130

Fig.12

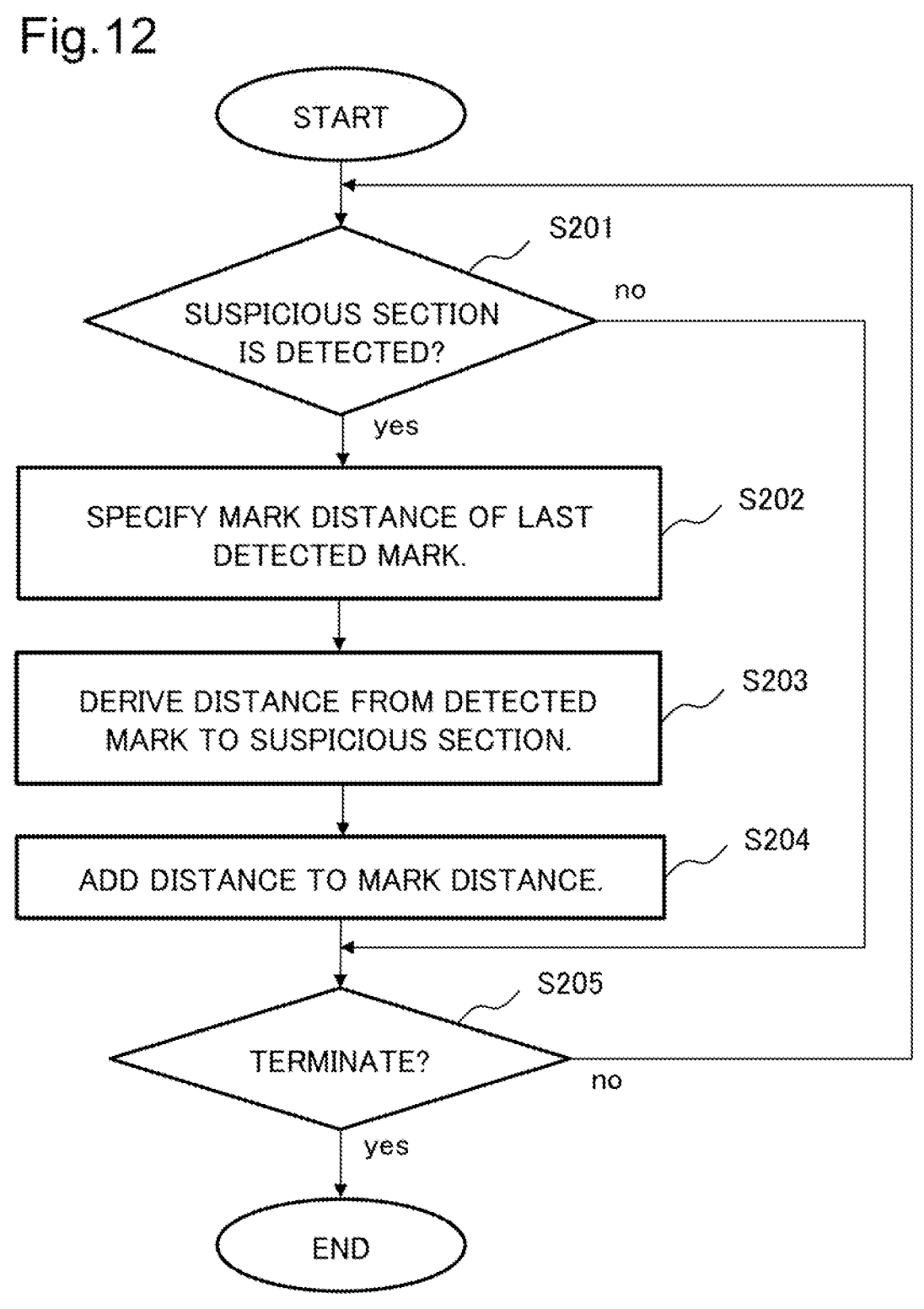

START

SUSPICIOUS SECTION
IS DETECTED?                    S201 no yes

SPECIFY MARK DISTANCE OF LAST
DETECTED MARK.                  S202

DERIVE DISTANCE FROM DETECTED
MARK TO SUSPICIOUS SECTION.     S203

ADD DISTANCE TO MARK DISTANCE.  S204

TERMINATE?                      S205 no yes

END

Fig.13

MONITORING DEVICE 100x

PROGRESS EXECUTION UNIT 110x

SECTION SPECIFICATION UNIT 144x

MONITORING DEVICE, MONITORING SYSTEM, MONITORING METHOD, AND RECORDING MEDIUM

This application is a National Stage Entry of PCT/JP2021/002241 filed on Jan. 22, 2021, which claims priority from Japanese Patent Application 2020-036329 filed on Mar. 4, 2020, the contents of all of which are incorporated herein by reference, in their entirety.

TECHNICAL FIELD

The present invention relates to a device that monitors a state.

BACKGROUND ART

In recent years, a tunnel inner state monitoring system that monitors an inner state of a tunnel has been developed.

For example, a tunnel inner state monitoring system in PTL 1 includes a plurality of detection devices, a control device, a display unit, and an operation unit. Each of the plurality of detection devices is installed on a road shoulder side at every predetermined interval in an extension direction of a tunnel.

The detection device includes a laser radar device, an infrared ray camera, a head-turning mechanism, and a detection unit. While driving the head-turning mechanism, the detection device causes the laser radar device to perform scanning in a horizontal direction within a range of 180 degrees, and acquires image information (mapping information) relating to an inner state of the tunnel through use of a publicly known LiDAR technique. Herein, LiDAR is an abbreviation for Light Detection And Ranging.

The detection device described above acquires information relating to a distance to a target, from a time period from irradiation with laser pulse light to reception of return light thereof, based on the mapping information acquired by the laser radar device through use of the LiDAR technique.

The control device measures a distance to the target inside the tunnel, based on the image information and the like acquired from the detection device through communication, and causes the display unit to display irregularities on an inner wall as a two-dimensional image.

In this manner, the tunnel inner state monitoring system in PTL 1 performs monitoring inside the tunnel. Thus, when a target to be monitored is an inner wall of the tunnel, the tunnel inner state monitoring system is capable of monitoring a degradation state of the inner wall.

Further, PTL 2 discloses a tunnel inner state detection device including a device main body unit that detects an inner state of a tunnel by subjecting acquired image information relating to a tunnel inner state to image processing, and a mounting unit that mounts the device main body unit to a roadside zone.

Further, PTL 3 discloses a construction flaw detection device that detects a flaw by comparing a first distance to a construction surface, which is acquired from reflection light received by a main light-receiving element, with a second distance to the construction surface, which is acquired from scattering light received by an auxiliary light-receiving element, with regard to laser light.

CITATION LIST

Patent Literature

[PTL 1] Japanese Unexamined Patent Application Publication No. 2002-257744
[PTL 2] Japanese Unexamined Patent Application Publication No. 2019-139657

[PTL 3] Japanese Unexamined Patent Application Publication No. 2004-251804
[PTL 4] Japanese Unexamined Patent Application Publication No. 2006-234383

SUMMARY OF INVENTION

Technical Problem

However, it is assumed that the tunnel inner state monitoring system and the like in PTLs 1 and 2 are installed in a roadside zone or the like inside a tunnel. Thus, the device blocks the roadside zone, which may cause a problem of hindering passage of a pedestrian, for example.

Further, there may be a case that the monitoring device monitors a state of an inner wall or the like of a conduit or the like such as water and sewage pipes, instead of that of a traffic tunnel. In such a case, when the monitoring system or the like is permanently installed inside the conduit or the like, a liquid or the like flowing through the conduit or the like may be hindered.

An object of the present invention is to provide a monitoring device and the like that are capable of performing monitoring in such a way as to acquire a state of an inner wall or the like of a tunnel, a conduit, or the like, without permanent installation therein.

Solution to Problem

A monitoring device according to the present invention includes: a progress execution unit that causes a combination of an irradiation unit and a light reception unit to progress inside a space that is tubular inside, the irradiation unit irradiating, with laser light, an exposed object that is an object exposed in the space of a tubular object being an object having the space, the light reception unit converting return light of the laser light from the exposed object into an electric signal; and a section specification unit that specifies, based on the electric signal, a predetermined-state section position being a position of a predetermined-state section that is, among sections of the exposed object that are irradiated with the laser light, the section indicating a predetermined state, and outputs the resultant.

Advantageous Effects of Invention

The monitoring device and the like according to the present invention are capable of performing monitoring in such a way as to acquire a state of an inner wall or the like of a tunnel, a conduit, or the like, without permanent installation therein.

BRIEF DESCRIPTION OF DRAWINGS

FIG. 3A is a side view of an acquisition structure unit.
FIG. 3B is a side view of an acquisition structure unit.
FIG. 3C is a side view of an acquisition structure unit.
FIG. 4 is a schematic diagram illustrating a configuration example (No. 2) of the monitoring device according to the example embodiment.

FIG. 12 is a schematic diagram illustrating a processing flow example of processing for deriving a suspicious section distance.

FIG. 13 is a schematic diagram illustrating a configuration example of a monitoring system including the monitoring device including a progress execution unit, which is illustrated in FIG. 4.

EXAMPLE EMBODIMENT

First Example Embodiment

The present example embodiment is an example embodiment relating to a monitoring device that includes a progress means, and the like.

[Configurations and Operations]

Figure 1:
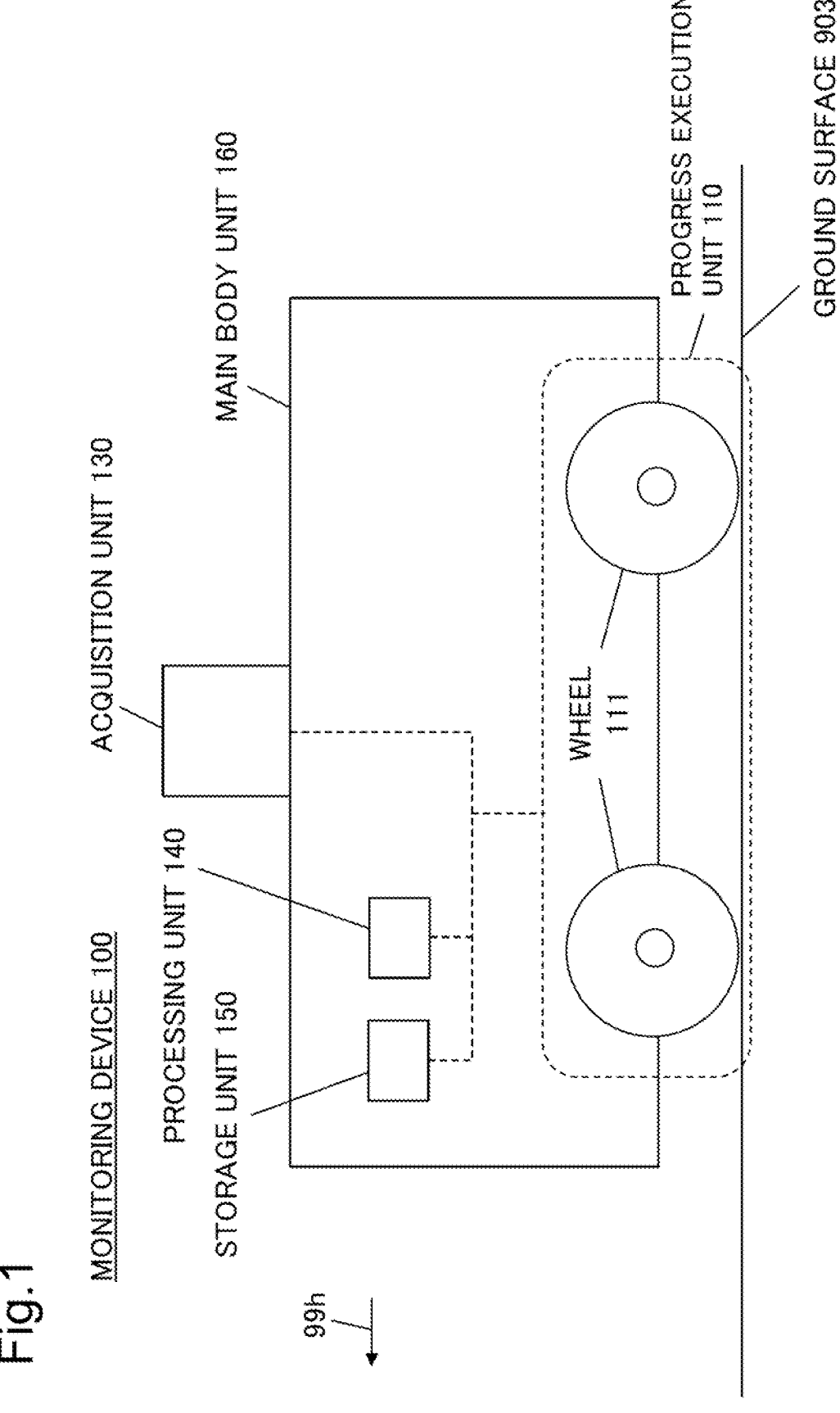
FIG. 1 is a schematic diagram illustrating a configuration example of a monitoring device according to an example embodiment.

FIG. 1 is a schematic diagram illustrating a configuration of a monitoring device 100 being an example of a monitoring device according to the present example embodiment. The monitoring device 100 includes a progress execution unit 110, an acquisition unit 130, a processing unit 140, and a storage unit 150. Those units are provided to a main body unit 160.

For example, the progress execution unit 110 is a unit for traveling of an automobile. For example, the progress execution unit 110 includes wheels 111 for traveling, a chassis to which the wheels 111 are mounted, and a steering mechanism that adjusts a steering angle of front wheels or rear wheels of the wheels 111. The progress execution unit 110 follows an instruction from the processing unit 140, and causes the monitoring device 100 to progress in a direction indicated with an arrow 99h. Herein, in the example embodiment, the term "progress" indicates movement along a predetermined route (progress route) from an entrance to an exit of a tunnel or the like. The progress execution unit 110 follows an instruction from the processing unit 140, adjusts a rotation speed of the wheels 111, and thus adjusts a speed of the monitoring device 100.

Figure 2:
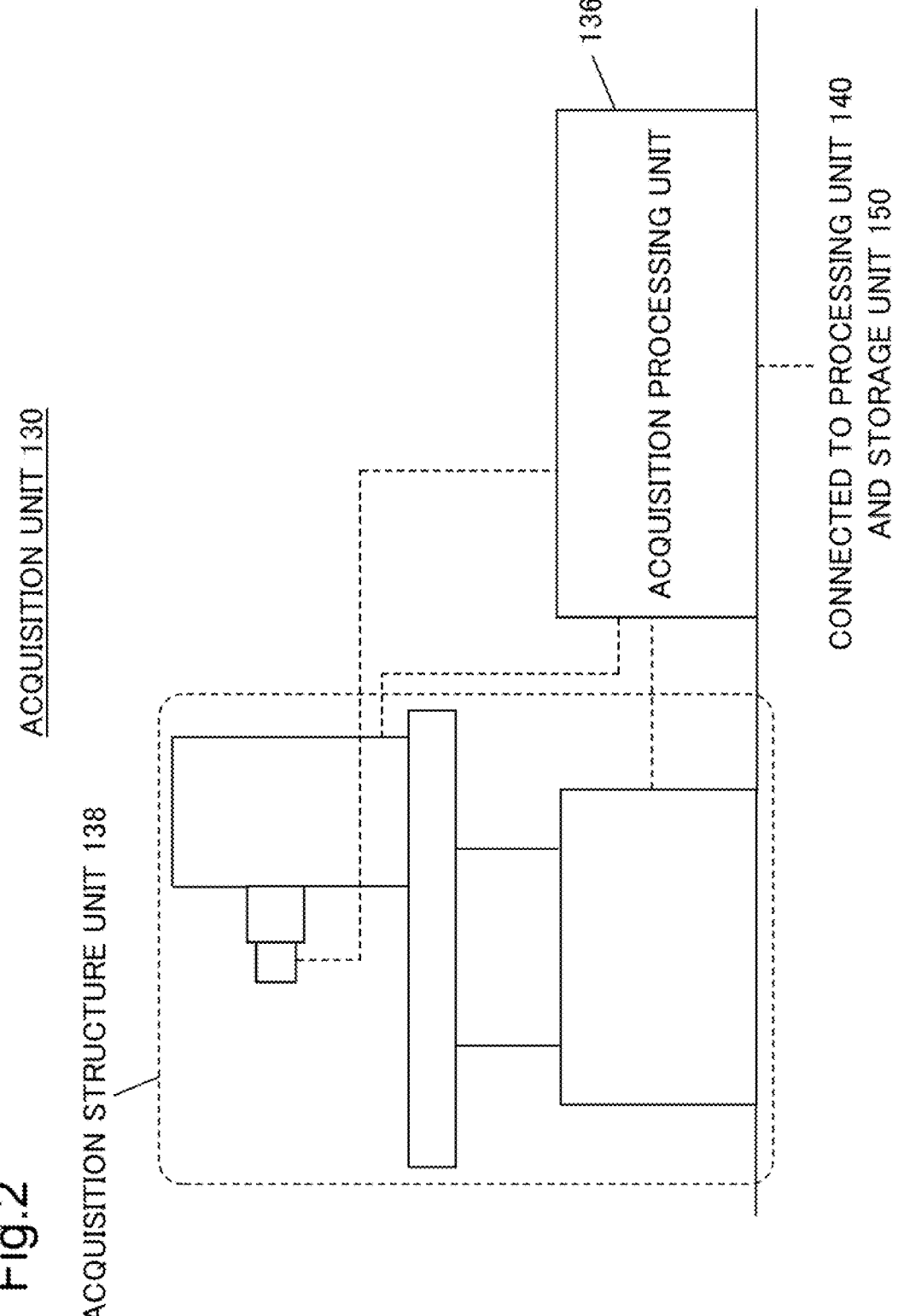
FIG. 2 is a schematic diagram illustrating a configuration example of an acquisition unit.

For example, as illustrated in FIG. 2, the acquisition unit 130 includes an acquisition processing unit 136 and an acquisition structure unit 138. FIGS. 3A, 3B, and 3C are schematic diagrams illustrating a configuration example of the acquisition structure unit 138 in FIG. 2. FIG. 3A is a side view of the acquisition structure unit 138 (a horizontal view with respect to a progress direction of the monitoring device 100, which is indicated with the arrow 99h). Further, FIG. 3B is a view of the acquisition structure unit 138, as seen in a direction of an arrow 99a illustrated in FIG. 3A. Note that the arrow 99a is a direction opposite to the progress direction of the monitoring device 100, which is indicated with the arrow 99h in FIG. 1. Further, FIG. 3C is a view of the acquisition structure unit 138, as seen in a direction of an arrow 99b illustrated in FIG. 3A.

The acquisition structure unit 138 includes an element unit 132, a first shaft 135a, a first drive unit 131a, members 81a and 81b, a second shaft 135b, and a second drive unit 131b.

The element unit 132 is fixed to the vicinity of the distal end of the first shaft 135a. The element unit 132 includes a laser element that is not illustrated, a light reception element, a drive unit that supplies a current for light emission to the laser element, and the like. The laser element radiates laser pulse light being parallel light in a direction indicated with an arrow 99c, in response to a drive current that is input from the drive unit. The drive current is generated by the drive unit from a control signal transmitted from the acquisition processing unit 136.

For example, when the laser pulse light is reflected by a tunnel inner wall, the reflected return light enters the above-mentioned light reception element in a direction indicated with an arrow 99d. The light reception element is connected to the acquisition processing unit 136 in FIG. 2, via a wiring line that is not illustrated. The light reception element converts the entering return light into an electric signal according to an intensity thereof, performs amplification or waveform shaping as required, and then inputs the resultant to the acquisition processing unit 136 in FIG. 2.

The directions indicated with the arrows 99c and 99d that are illustrated in FIGS. 3A, 3B, and 3C are not fixed but changed along with rotation of the element unit 132.

It is assumed that an emission surface of the laser element and an incidence surface of the light reception element are close to each other and are positioned at a point 97.

The first drive unit 131a is connected to the acquisition processing unit 136 in FIG. 2, via a wiring line that is not illustrated. The first drive unit 131a rotates in a direction indicated with an arrow 99g or the arrow 99h in FIG. 3A, according to a control signal transmitted from the acquisition processing unit 136. Through the rotation, the first drive unit 131a adjusts a rotation angle position relating to rotation of the first shaft 135a. Through the adjustment of the rotation angle, an emission direction of the laser pulse light from the element unit 132 and an incidence direction of the return light to the element unit 132, which is an opposite direction to the emission direction, are associated with each other, and the rotation angle position is adjusted according to the rotation in the direction indicated with the arrow 99g or the direction opposite thereto.

The second drive unit 131b is connected to the acquisition processing unit 136 in FIG. 2, via a wiring line that is not illustrated. The second drive unit 131b rotates in a direction indicated with an arrow 99e or a direction opposite thereto in FIG. 3C. Through the rotation, the second drive unit 131b adjusts a rotation angle position relating to rotation of the second shaft 135b. Through adjustment of the rotation angle position, an emission direction of the laser pulse light from the element unit 132 and an incidence direction of the return light to the element unit 132, which is an opposite direction to the emission direction, are associated with each other, and the rotation angle position is adjusted in the direction indicated with the arrow 99*e* or the direction opposite thereto.

The members 81*a* and 81*b* fix the second shaft 135*b* and the first drive unit 131*a*. A shape or a size of the members 81*a* and 81*b* are set in such a way that the emission surface of the laser element and the incidence surface of the light reception element are not deviated from the position of the point 97 through rotation of the first shaft 135*a* by the first drive unit 131*a* or rotation of the second shaft 135*b* by the second drive unit 131*b*.

The acquisition processing unit 136 in FIG. 2 comprehensively performs irradiation with the laser pulse light from the element unit 132 and detection of the return light, while varying the rotation angle positions according to rotation in the directions indicated with the arrow 99*g* in FIG. 3A and the arrow 99*e* in FIG. 3C within a predetermined setting range. With this, the acquisition processing unit 136 acquires a difference between an irradiation time of the laser pulse light and an incidence time of the laser pulse light within the setting range. The difference indicates a length of an optical path in which the laser pulse light is reflected by an inner wall or the like in a tunnel and returns as return light. A technique used in a commercially available laser range finder may be applied to a method of acquiring the difference.

The acquisition processing unit 136 stores difference information indicating the difference of the rotation angle positions within the setting range (hereinafter, simply referred to as "difference information" in some cases) in the storage unit 150 in FIG. 1, and prepares for subsequent processing by the processing unit 140.

Note that, in addition, the acquisition unit 130 is provided with a spacer, a member, and the like, which are not illustrated, for preventing the members of the acquisition unit 130 from being brought into contact with the main body unit 160 in FIG. 1 through rotation in the two axial directions described above.

Note that the monitoring device 100 acquires the difference information relating to the rotation angle positions within the setting range while stopping progress of the monitoring device 100 by the progress execution unit 110 in FIG. 1 or continuing progress thereof.

The processing unit 140 transmits a control signal, and thus causes the progress execution unit 110 to execute progress in the direction indicated with the arrow 99*h*. Further, the processing unit 140 specifies a suspicious section that is a section in a state of being suspected to have abnormality on an inner wall of a tunnel. For example, the abnormality is peeling of a tunnel inner wall or the like.

Herein, it is assumed that the processing unit 140 acquires the difference information relating to the rotation angle positions within the setting range while stopping progress of the monitoring device 100 by the progress execution unit 110 in FIG. 1. In this case, the processing unit 140 specifies a suspicious section on a tunnel inner wall with respect to the difference information relating to the rotation angle positions within the setting range, which is acquired while stopping progress of the monitoring device 100. For example, the processing unit 140 executes the specification by specifying the rotation angle position with the difference information that is significantly different in comparison with pieces of the difference information in a periphery. The rotation angle position is a combination of the rotation angle position relating to the rotation in the direction indicated with the arrow 99*g* in FIG. 3A and the rotation angle position relating to the rotation in the direction indicated with the arrow 99*e* in FIG. 3. FIG. 3B. When a positional relationship between the monitoring device 100 and the tunnel inner wall is fixed, a position of the suspicious section is determined based on the rotation angle position. This is because a point at which a line of the rotation angle position passing through the point 97 and the tunnel inner wall surface intersect with each other is specified as the position of the suspicious section.

The processing unit 140 may specify the suspicious section after converting the difference information relating to the rotation angle positions within the setting range, into three-dimensional positional information formed of a group of points of the tunnel inner wall in the real space. In this case, for example, the processing unit 140 also displays the suspicious section in a three-dimensional manner on the three-dimensional positional information. Herein, it is assumed that the processing unit 140 is connected to a display unit that is not illustrated.

Herein, it is assumed that the processing unit 140 is in a state of being allowed to use the difference information relating to the rotation angle positions within the setting range or the information derived from the difference information, in the past. In this case, the processing unit 140 may specify the suspicious section, based on comparison between the information and information that is newly measured in association to the information.

In contrast, when the acquisition unit 130 acquires the difference information while the monitoring device 100 progresses, the processing unit 140 always determines whether the difference information may have abnormality. In this case, for example, the processing unit 140 makes the rotation angle position for acquiring the difference information, be constant with respect to the rotation angle position relating to the rotation in the direction indicated with the arrow 99*g* in FIG. 3A. Then, the processing unit 140 acquires the difference information while varying the rotation angle position relating to the rotation in the direction indicated with the arrow 99*e* in FIG. 3B. As described above, the direction opposite to the direction indicated with the arrow 99*a* in FIG. 3A is the progress direction of the monitoring device 100. Thus, the acquisition unit 130 progresses in a direction parallel to the arrow 99*a* along with progress of the monitoring device 100, and hence the acquisition unit 130 is capable of comprehensively acquiring the difference information on the tunnel inner wall.

When the processing unit 140 determines that the difference information has abnormality, the section is specified as a suspicious section for the abnormality. Herein, for example, when it is determined that the difference information may have abnormality, a difference of a distance is significantly varied as compared to a peripheral position. The processing unit 140 specifies the position of the suspicious section, based on, for example, a progress position of the monitoring device 100 and the rotation angle position in the direction indicated with the arrow 99*e* in FIG. 3B. The processing unit 140 derives the progress position, based on, for example, a progress speed at which the progress execution unit 110 executes progress and a progress time period relating to progress from a reference position such as a tunnel entrance.

Note that a railroad track that defines a traveling route of wheels (a railroad track for a train or the like) may be laid on a ground surface 903 in FIG. 1. In this case, the monitoring device 100 progresses in a fixed route along the railroad track. In this case, accuracy at which the monitoring device 100 derives the suspicious section on the tunnel inner wall, based on the difference information, can easily be improved.

For example, the processing unit 140 is a central processing unit of a computer. In this case, the processing unit 140 executes processing described in the example embodiment, with a program or information stored in advance in the storage unit 150. Further, the storage unit 150 stores information instructed by the processing unit 140. Further, the storage unit 150 is made to be in a state of allowing the information instructed by the processing unit 140, to be read out by the processing unit 140.

In the example described above, description is made on a case in which the progress execution unit 110 has a configuration included in an automobile or a train or a similar configuration thereto. However, the progress execution unit 110 may have another configuration described below.

FIG. 4 is a schematic diagram illustrating a configuration example (No. 2) of the monitoring device 100 according to the present example embodiment. The progress execution unit 110 of the monitoring device 100 in FIG. 4 is a floating propulsive force generation unit 110*a*.

The floating propulsive force generation unit 110*a* controls a rotation speed of a plurality of propellers or orientation of each of the propellers as required as in a case of a drone, for example, and thus causes the monitoring device 100 to float and generates a propulsive force in the progress direction being the direction indicated with the arrow 99*h*. For example, the floating propulsive force generation unit 110*a* includes sensors that acquire a height position from the ground surface, a progress direction, and a progress speed of the monitoring device 100, and transmits information acquired by those sensors to the processing unit 140. Such a configuration is included in a commercially available drone and is publicly known, and hence detailed description therefor is omitted.

The acquisition unit 130, the storage unit 150, and the processing unit 140 in FIG. 4 are similar to those illustrated in FIGS. 3A, 3B, and 3C, except that a control target relating to progress of the monitoring device 100 is the floating propulsive force generation unit 110*a*.

Figure 5A:
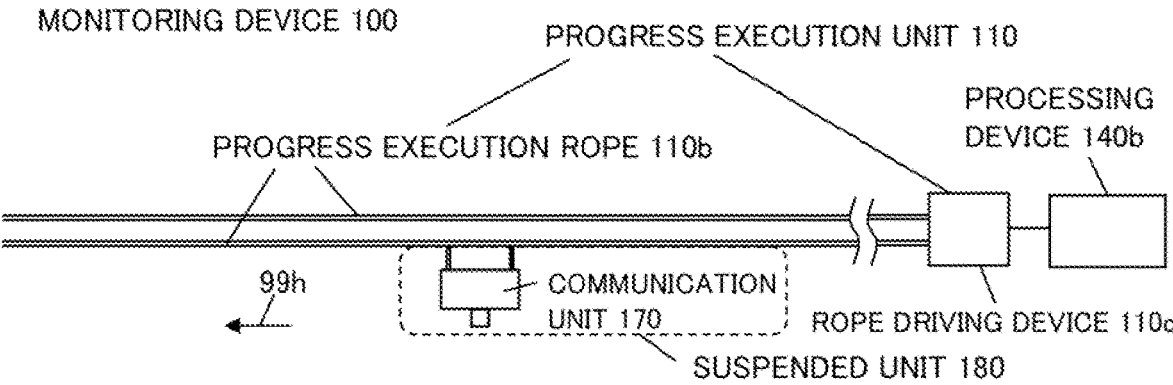
FIG. 5A is a schematic diagram illustrating a configuration example (No. 3) of the monitoring device according to the example embodiment.
Figure 5B:
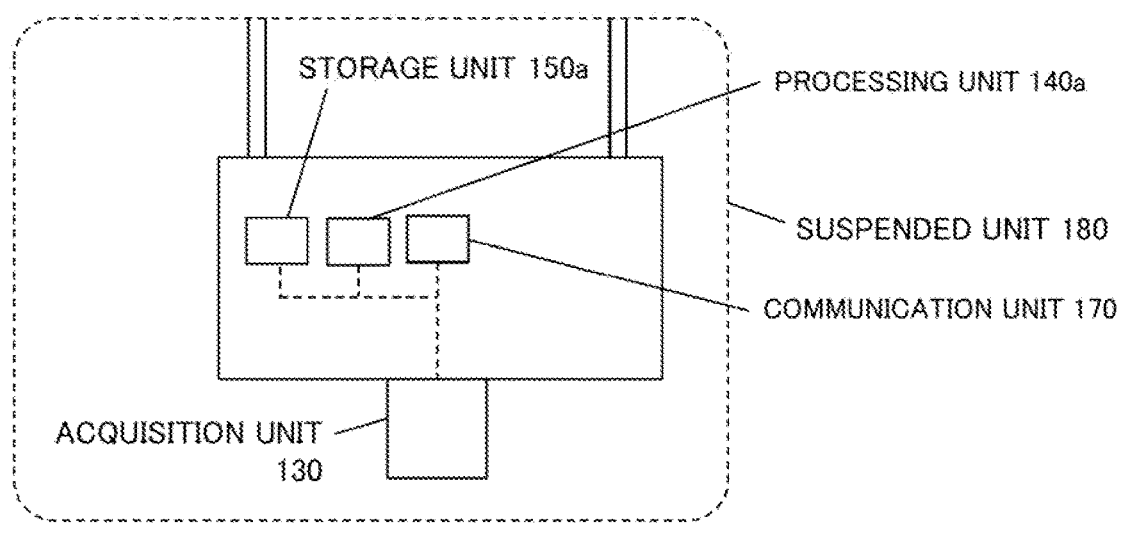
FIG. 5B is an enlarged diagram of a suspended unit.

FIG. 5A is a schematic diagram illustrating a configuration example (No. 3) of the monitoring device 100 according to the present example embodiment. FIG. 5B is an enlarged diagram of a suspended unit 180, which is surrounded by a dot line in FIG. 5A. The progress execution unit 110 in FIG. 5A is a combination of a progress execution rope 110*b* and a rope driving device 110*c*.

The progress execution unit 110 in FIG. 5A is similar to a rope of a ropeway and a driving mechanism thereof. The rope driving device 110*c* causes the progress execution rope 110*b* on a lower side to progress in the direction indicated with the arrow 99*h* and causes the progress execution rope 110*b* on an upper side to progress in a direction opposite to the direction indicated with the arrow 99*h*. The suspended unit 180 is suspended from the progress execution rope 110*b* on the lower side. As the progress execution rope 110*b* on the lower side progresses in the direction indicated with the arrow 99*h*, the suspended unit 180 that is suspended therefrom also progresses.

The suspended unit 180 includes an acquisition unit 130, a storage unit 150*a*, a processing unit 140*a*, and a communication unit 170. The acquisition unit 130 is similar to the acquisition unit 130 in FIGS. 3A, 3B, and 3C. By an instruction from the processing unit 140*a*, the acquisition unit 130 acquires the difference information relating to the rotation angle positions within the setting range (information indicating a distance to the tunnel inner wall). The processing unit 140*a* causes the storage unit 150*a* to comprehensively store combination information in which the acquired difference information and a rotation angle position of an irradiation direction of laser pulse light at a time of the acquisition are combined with each other, with respect to the rotation angle position. Further, the processing unit 140*a* causes the communication unit 170 to transmit the acquired combination information to a processing device 140*b* via wireless communication.

The processing device 140*b* includes a processing unit, a storage unit, and a communication unit, which are not illustrated. The processing device 140*b* is combined with the processing unit 140*a* via the communication unit 170, and thus executes operations other than operations to be executed by the processing unit 140*a*, among the operations to be executed by the processing unit 140 in FIG. 1.

The processing device 140*b* transmits a control signal to the rope driving device 110*c*, thereby driving the progress execution rope 110*b*. Through the driving, the suspended unit 180 progresses.

With regard to the monitoring device 100 in FIG. 5A, the suspended unit 180 progresses in the fixed route as the progress execution rope 110*b* progresses. The monitoring device 100 in FIG. 5A does not require steering or the like for the progress, and hence accuracy of specifying a suspicious section on a tunnel inner wall, based on the difference information, can be easily improved.

Figure 6:
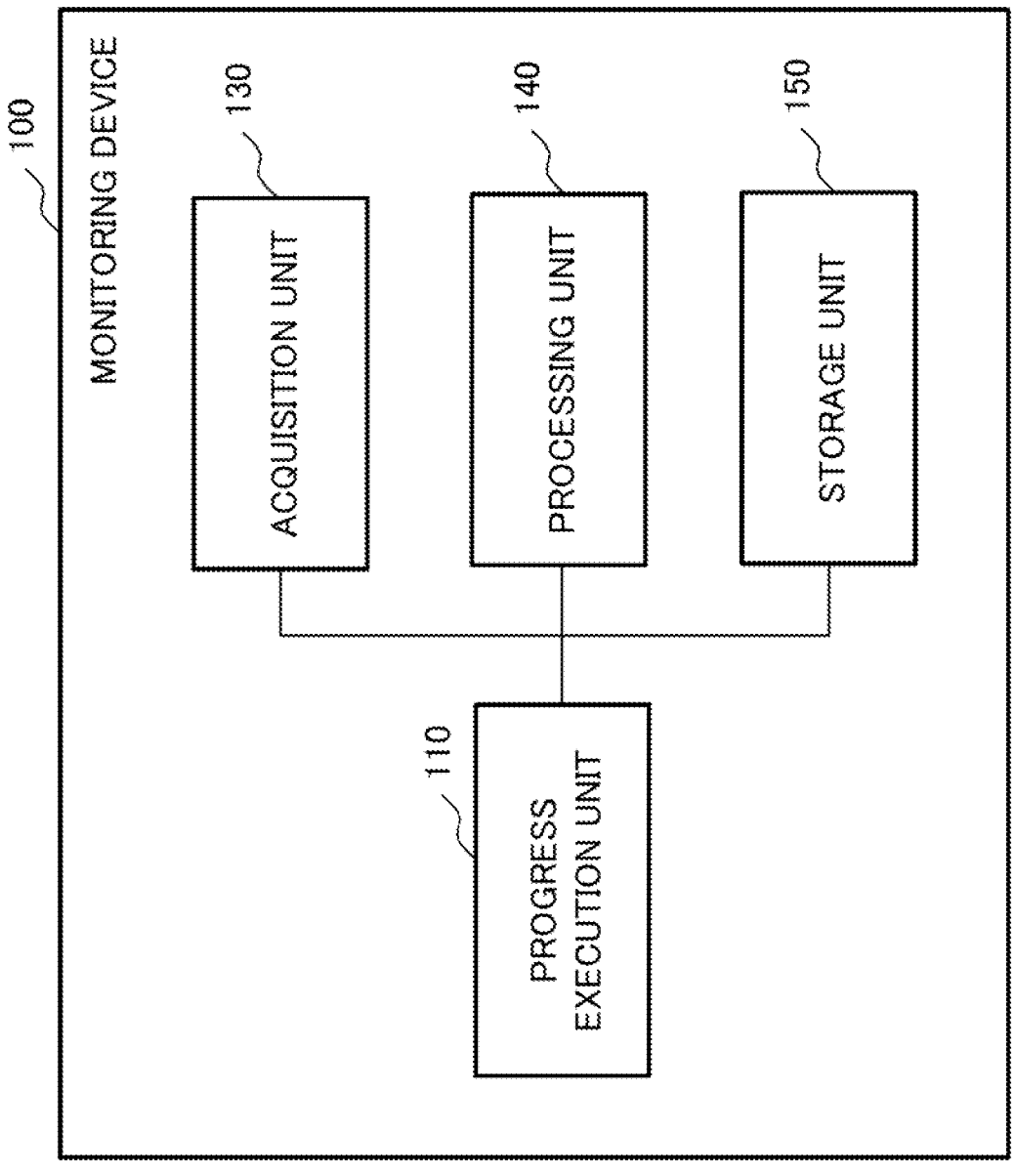
FIG. 6 is a block diagram illustrating a configuration example of the monitoring device according to the example embodiment.

FIG. 6 is a block diagram illustrating the monitoring device 100 described above in a generalized manner. The monitoring device 100 includes the progress execution unit 110, the acquisition unit 130, the processing unit 140, and the storage unit 150. The progress execution unit 110 is, for example, the progress execution unit 110 illustrated in FIG. 1, FIG. 4, or FIG. 5A. Further, the acquisition unit 130 is, for example, the acquisition unit 130 illustrated in FIG. 1, FIG. 2, FIG. 4, or FIG. 5B. The processing unit 140 is the processing unit 140 illustrated in FIG. 1 or FIG. 4, or a combination of the processing unit 140*a* illustrated in FIG. 5B and a processing unit of the processing device 140*b*, which is not illustrated. The storage unit 150 is the storage unit 150 illustrated in FIG. 1 or FIG. 4, or a combination of the storage unit 150*a* in FIG. 5B and a storage unit of the processing device 140*b*, which is not illustrated.

Figure 7:
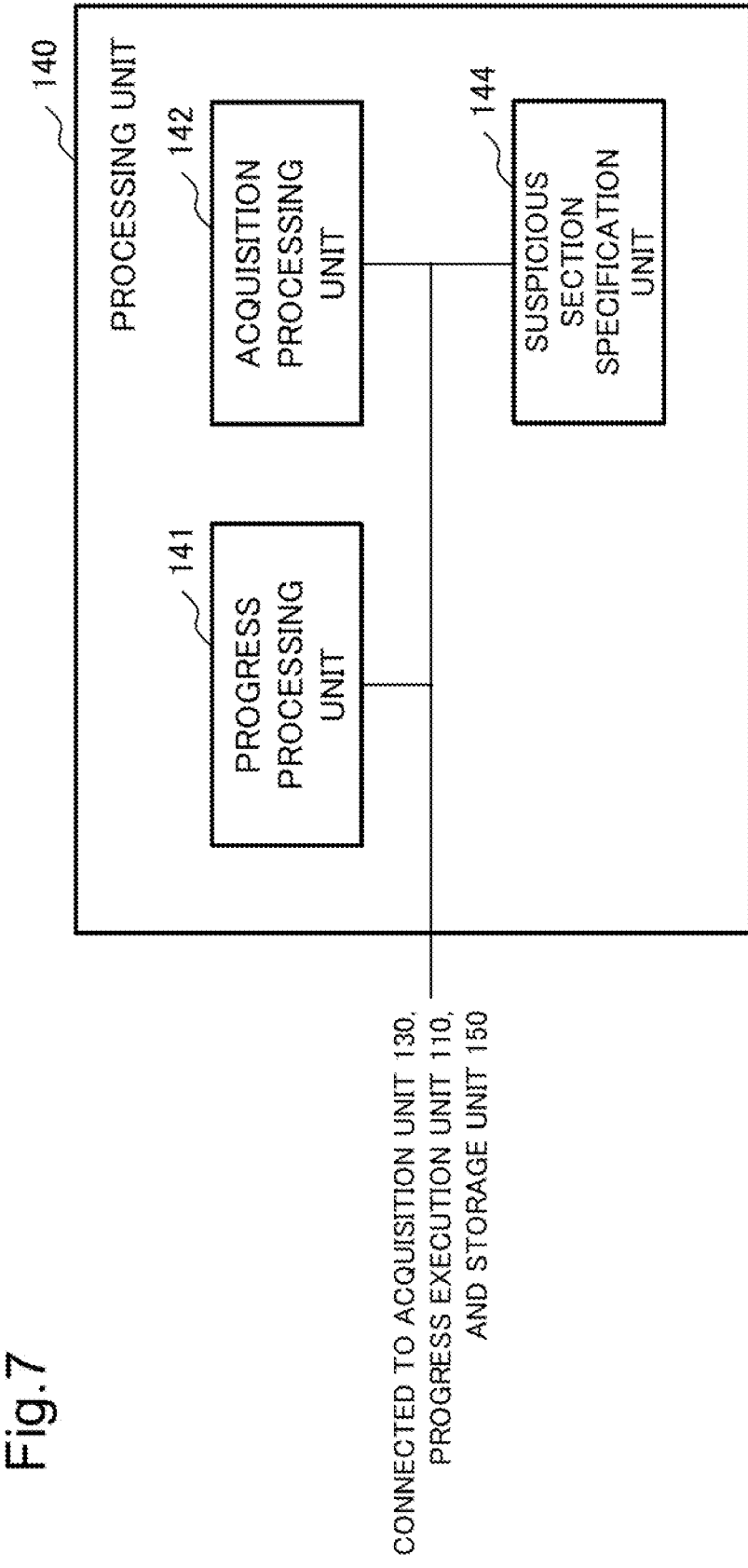
FIG. 7 is a block diagram illustrating a configuration example of a processing unit.

FIG. 7 is a block diagram illustrating a configuration example of the processing unit 140 in FIG. 6. The processing unit 140 includes a progress processing unit 141, an acquisition processing unit 142, and a suspicious section specification unit 144.

The progress processing unit 141 controls progress of the monitoring device 100 by the progress execution unit 110 in FIG. 6. Further, the acquisition processing unit 142 acquires, with the acquisition unit 130 in FIG. 6, the combination information of the distance information and the rotation angle position described above through controlling the rotation angle position relating to the rotation of the irradiation direction of the laser pulse light by the element unit 132 in FIG. 4.

Further, the suspicious section specification unit 144 specifies a suspicious section having abnormality on the tunnel inner wall, based on the difference information acquired by the acquisition processing unit 142. Then, the suspicious section specification unit 144 derives the position of the specified suspicious section. The suspicious section specification unit 144 executes the derivation, based on the position of the monitoring device 100 in FIG. 6 and the difference information. The positional information on the monitoring device 100 is derived by the progress processing unit 141, based on, for example, a progress distance from a reference position such as a tunnel entrance. Herein, the progress distance is a distance along the progress route of the monitoring device 100. Further, the progress route is a route in which the monitoring device 100 is assumed to progress.

Figure 8:
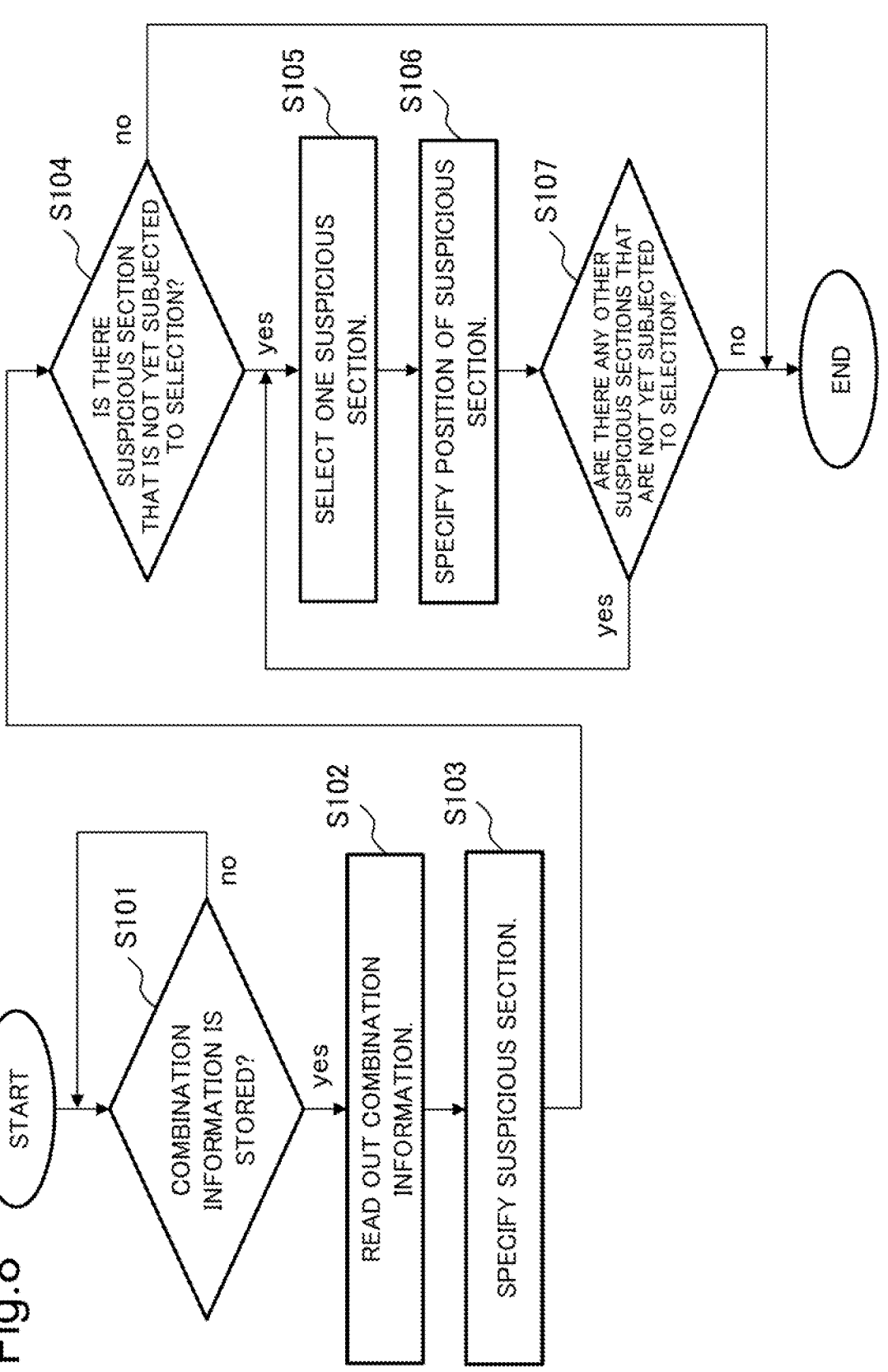
FIG. 8 is a schematic diagram illustrating a processing flow example of processing to be executed by a suspicious section specification unit.

FIG. 8 is a schematic diagram illustrating a processing flow example of processing to be executed by the suspicious section specification unit 144. In FIG. 8, it is assumed that progress of the monitoring device 100 is stopped and then the difference information is acquired.

For example, the suspicious section specification unit 144 starts the processing in FIG. 8 when starting information is input from the outside. Then, as processing in S101, the suspicious section specification unit 144 first determines whether the acquisition unit 130 in FIG. 6 causes the storage unit 150 to store the combination information of the difference information and the rotation angle position in the laser pulse irradiation direction. The combination information is comprehensively acquired with respect to the rotation angle position.

When the determination result of the processing in S101 is yes, the suspicious section specification unit 144 executes processing in S102. In contrast, when the determination result of the processing in S101 is no, the suspicious section specification unit 144 executes the processing in S101 again.

When the processing in S102 is executed, the suspicious section specification unit 144 reads the combination information out from the storage unit 150, as the processing. Then, the suspicious section specification unit 144 specifies a suspicious section, based on the combination information, as processing in S103. For example, the suspicious section specification unit 144 executes the specification by determining, for example, the rotation angle position in the irradiation direction with a difference from the difference information of a periphery, which exceeds a predetermined threshold value, as a suspicious section.

Subsequently, as processing in S104, the suspicious section specification unit 144 determines whether there is any suspicious section specified by the processing in S103, which is not yet subjected to selection in the subsequent processing. At this state, when there is no specified suspicious section, the suspicious section specification unit 144 determines that there is no specified suspicious section that is not yet subjected to selection in the subsequent processing.

When the determination result of the processing in S104 is yes, the suspicious section specification unit 144 executes processing in S105. In contrast, when the determination result of the processing in S104 is no, the suspicious section specification unit 144 terminates the processing in FIG. 8.

When the processing in S105 is executed, the suspicious section specification unit 144 selects one suspicious section, as the processing. Then, the suspicious section specification unit 144 specifies the position of the suspicious section, as processing in S106. As described above, the position is determined based on the position (of the element unit) of the monitoring device 100, the rotation angle position relating to the rotation of the emission direction of the laser pulse light, and the shape of the tunnel inner wall.

In the description given above, description is made on a case in which the monitoring device specifies a suspicious section on an inner wall, based on the above-mentioned difference information indicating a distance from the element unit of the monitoring device to the tunnel inner wall. However, the suspicious section may be specified based on intensity information indicating intensity of an electric signal, which is acquired by converting the return light of the laser light irradiated from the laser element at the light reception unit (intensity of return light). In this case, the laser light may be continuous light. Further, the suspicious section may be specified based on both the intensity of the return light of the laser pulse light irradiated from the element unit and the above-mentioned difference information indicating a distance from the element unit to the tunnel inner wall.

EFFECTS

The monitoring device according to the present example embodiment includes the progress execution unit, and thus is capable of progressing. Therefore, the monitoring device is capable of specifying a suspicious section having abnormality on the tunnel inner wall without permanent installation in a space inside the tunnel.

Second Example Embodiment

The method of deriving a distance of the monitoring device from the reference position, based on an integrated value of the progress distance and the progress time, which is described in the first example embodiment, may have a difficulty in accurately deriving the distance in some cases. This is because, when the progress distance from the reference position is long, an error may occur to the progress distance to be derived.

In order to solve the problem, in a monitoring system according to the present example embodiment, a mark that can be detected and identified by the laser pulse light is provided at a closer position than the reference position on the tunnel inner wall. The position of the mark is accurately defined in advance through measurement or the like. Then, through irradiation with laser light and detection of return light, a suspicious section having abnormality such as lift or a cave-in of the inner wall is specified. Further, the monitoring system according to the present example embodiment derives the position of the suspicious section from the specified mark. The mark is positioned closer to the monitoring device with respect to the above-mentioned reference position, and hence the distance from the mark to the monitoring device can be derived at high accuracy. Further, the distance of the mark from the reference position is derived at high accuracy as described above. Thus, through use of the mark, the monitoring system according to the present example embodiment can improve derivation accuracy of the position of the suspicious section.

[Configurations and Operations]

Figure 9:
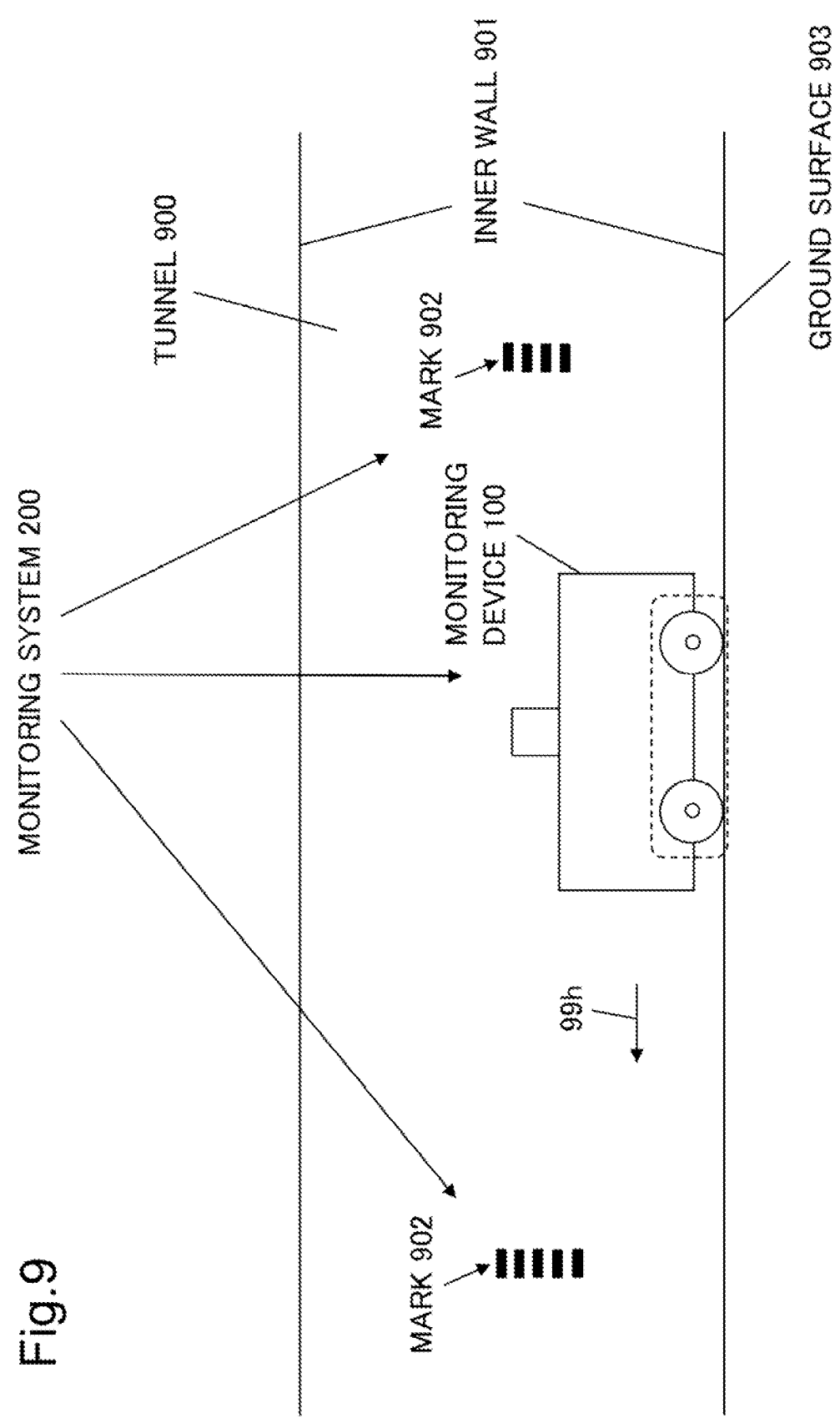
FIG. 9 is a schematic diagram illustrating a configuration example of a monitoring system according to a second example embodiment.
Figure 10:
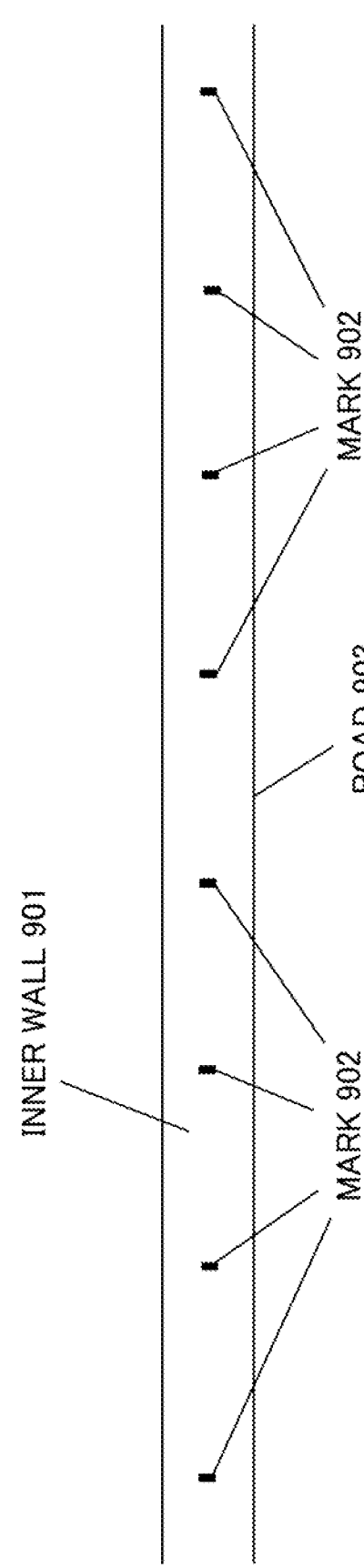
FIG. 10 is a schematic diagram illustrating an installation example for a marked tunnel.

FIG. 9 is a schematic diagram illustrating a configuration of a monitoring system 200 being an example of the monitoring system according to the present example embodiment. Further, FIG. 10 is a schematic diagram illustrating an installation example of marks 902 of the monitoring system 200 in a tunnel 900.

As illustrated in FIG. 9, the monitoring system 200 includes the plurality of marks 902 and a monitoring device 100. The mark 902 has a predetermined projection-recess pattern. Each of the marks 902 is installed or formed on an inner wall 901 of the tunnel 900. A black part of the mark 902 in FIG. 9 is either part projecting or being recessed from the periphery. For example, as illustrated in FIG. 10, the marks 902 are provided at a substantially equal interval on the inner wall 901 of the tunnel 900.

The marks 902 each have shapes that are different from each other. For example, in the example of FIG. 9, the mark 902 on the left side, which has five black parts, and the mark 902 on the right side, which has four black parts, have different shapes from each other. Further, a distance indicating a length of the progress route relating to progress of the monitoring device 100, which is from a reference position such as an entrance and an exit of the tunnel 900 to each of the marks 902, (hereinafter, referred to as a "mark distance" or a "first distance") is accurately acquired in advance through measurement or the like. Thus, the monitoring device 100 is capable of acquiring a mark distance of the mark 902 by specifying the shape of the mark 902.

Meanwhile, for example, the monitoring device 100 includes a configuration similar to that of the monitoring device 100 illustrated in FIGS. 1 and 6. Operations to be executed by the monitoring device 100 are different from those illustrated in FIGS. 1 and 6 in the following matters. Hereinafter, description will be made on parts of the operations to be executed by the monitoring device 100 in FIG. 9, which are different from those executed by the monitoring device 100 illustrated in FIGS. 1 and 6.

The suspicious section specification unit 144 in FIG. 7 detects the marks 902 illustrated in FIGS. 9 and 10, through acquisition of the above-mentioned combination information. The combination information is a combination of the difference information and the rotation angle position relating to rotation of an irradiation direction of a laser pulse. As described above, the marks 902 each have different shapes. Further, the above-mentioned mark distance being the progress distance of each of the marks 902 from the reference position such as an entrance and an exit of the tunnel is accurately acquired in advance through measurement or the like. Therefore, the processing unit 140 causes the storage unit 150 to hold information in which the shapes and the mark distances of the marks 902 are associated with each other, and thus the mark distance of the specified mark 902 can be acquired.

Similarly to the case in the first example embodiment, the suspicious section specification unit 144 specifies a suspicious section having abnormality on the tunnel inner wall. Then, the suspicious section specification unit 144 derives the progress distance (suspicious section distance) from the reference position of the tunnel to the suspicious section. The derivation is executed in the processing in S106 in FIG. 8.

Examples of the method of deriving a suspicious section distance, which is executed by the suspicious section specification unit 144, include the following two methods.

(a) First Method of Deriving Suspicious Section Distance

The processing unit 140 regards a progress distance (suspicious section distance) from the reference position to the suspicious section as a value acquired by adding a mark distance of the last observed mark 902 to a progress distance from the mark distance, which is acquired based on a traveling speed. Suppose that the processing unit 140 acquires a suspicious section distance, based on an integrated value of the progress distance and the progress time from the reference position such as an entrance of the tunnel, without using the marks 902. In this case, for example, an error of the suspicious section distance is increased due to deviation from the traveling route or the like, which may cause a difficulty in specifying the suspicious section for an additional inspection, which will be executed later. However, the monitoring device 100 according to the present example embodiment derives the position of the suspicious section, based on the specified mark 902. The mark 902 is closer to the monitoring device 100 with respect to the above-mentioned reference position, and hence the distance from the mark 902 to the monitoring device 100 can be derived at high accuracy. Further, the distance from the above-mentioned reference position to the mark 902 is derived at high accuracy, as described above. Thus, through use of the mark 902, the monitoring device 100 according to the present example embodiment is capable of improving derivation accuracy for the position of the suspicious section.

(b) Second Method of Deriving Suspicious Section Distance

Figure 11:
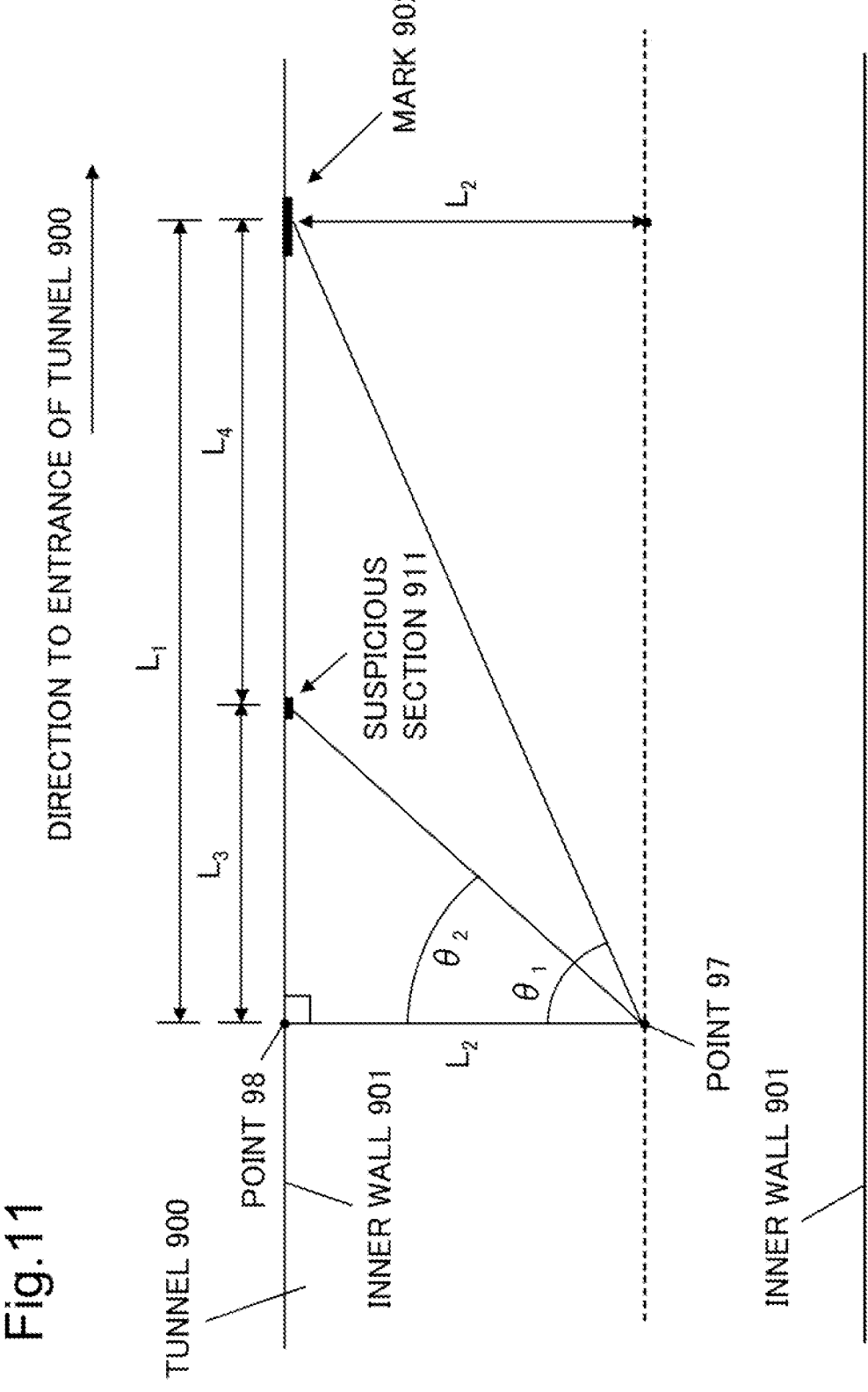
FIG. 11 is a schematic diagram illustrating a second method of deriving a suspicious section distance.

FIG. 11 is a schematic diagram illustrating a second method of deriving a suspicious section distance. A point 97 in FIG. 11 is the same as the point 97 in FIGS. 3A, 3B, and 3C. Further, a distance $L_2$ in FIG. 11 is a length of a perpendicular line connecting the point 97 and a point 98, which are on the inner wall 901 of the tunnel 900 in FIG. 9 or FIG. 10, to each other. Further, a rotation angle position $\theta_1$ is a rotation angle position in the direction indicated with the arrow 99g in FIG. 3A with respect to the mark 902. Further, a rotation angle position θ2 is a rotation angle position in the direction indicated with the arrow 99g in FIG. 3A with respect to a suspicious section 911.

In the case described above, a distance $L_1$ from the point 98 to the center of the mark 902 is expressed by $L_2 \tan \theta_1$. Further, a distance $L_3$ from the point 98 to the center of the suspicious section is expressed by $L_2 \tan \theta_2$. Thus, a distance $L_4$ from the center of the mark 902 to the suspicious section 911 is acquired by $L_1$-$L_3$.

Further, as described above, it is assumed that a distance $L_s$ from the entrance of the tunnel 900 to the mark 902 is accurately acquired through measurement or the like. In this case, a distance $L_{sus}$ from the entrance of the tunnel 900 to the suspicious section 911 is acquired by $L_{sus}=L_s+L_4$.

Note that the suspicious section specification unit 144 derives a suspicious section distance by any one of the methods (a) and (b) described above. Then, the suspicious section specification unit 144 specifies a position of the suspicious section, based on the suspicious section distance and the rotation angle position relating to the rotation in the direction indicated with the arrow 99g in FIG. 5A with respect to the suspicious section. The specification of the position is the processing in S106 in FIG. 8, which is executed by the suspicious section specification unit 144 in the present example embodiment.

FIG. 12 is a schematic diagram illustrating a processing flow example of the processing of deriving a suspicious section distance, which is executed by the suspicious section specification unit 144 in the present example embodiment. In FIG. 12, it is assumed that the suspicious section is specified while the monitoring device 100 in FIG. 1 progresses. The method of specifying a suspicious section while the monitoring device 100 progresses is as described in the first example embodiment, and hence description therefor is omitted herein.

For example, the suspicious section specification unit 144 starts the processing in FIG. 12 when starting information is input from the outside. Then, as processing in S201, the suspicious section specification unit 144 first determines whether a suspicious section is detected. For example, the suspicious section specification unit 144 performs the determination by determining that difference information on an angle position irradiated with laser pulse light is significantly varied as compared to difference information on a peripheral angle position.

When a determination result of the processing in S201 is yes, the suspicious section specification unit 144 executes processing in S202. In contrast, when the determination result of the processing in S201 is no, the suspicious section specification unit 144 executes processing in S205.

When the processing in S202 is executed, the suspicious section specification unit 144 specifies a mark distance being a progress distance from the reference position such as an entrance of the tunnel 900 to the last detected mark 902, as the processing. As described above, the marks 902 each have different shapes. Therefore, the suspicious section specification unit 144 is capable of identifying the marks 902 individually. Thus, the suspicious section specification unit 144 is capable of deriving the mark distance of the last detected mark 902 by acquiring the mark distance of each of the marks 902 through measurement or the like, and storing the acquired distance in advance in the storage unit 150 in FIG. 1.

Further, as processing in S203, the suspicious section specification unit 144 derives a distance from the last detected mark 902 to a suspicious section that is detected in the course of the processing in S201. The distance is a distance in a progress direction relating to progress being progress of the monitoring device 100 for the tunnel 900 from the entrance to the exit of the tunnel 900. The suspicious section specification unit 144 may derive the distance by any one of the first method and the second method that are described above.

Further, as processing in S204, the suspicious section specification unit 144 adds the distance derived in the processing in S203 to the mark distance specified in the processing in S202. Then, the suspicious section specification unit 144 specifies the position of the suspicious section, based on the distance derived in the processing in S204 and the rotation angle position relating to the rotation in the direction indicated with the arrow 99*e* in FIG. 3C, at which the suspicious section is detected.

Further, as the processing in S205, the suspicious section specification unit 144 determines whether the processing in FIG. 12 is terminated. When the determination result of the processing in S205 is yes, the suspicious section specification unit 144 terminates the processing in FIG. 12. In contrast, when the determination result of the processing in S205 is no, the suspicious section specification unit 144 executes the processing in S201 again.

Similarly to the monitoring device 100 according to the first example embodiment, the monitoring device 100 according to the present example embodiment includes the progress execution unit 110 in FIG. 4 or FIG. 5A in some cases.

Figure 13:
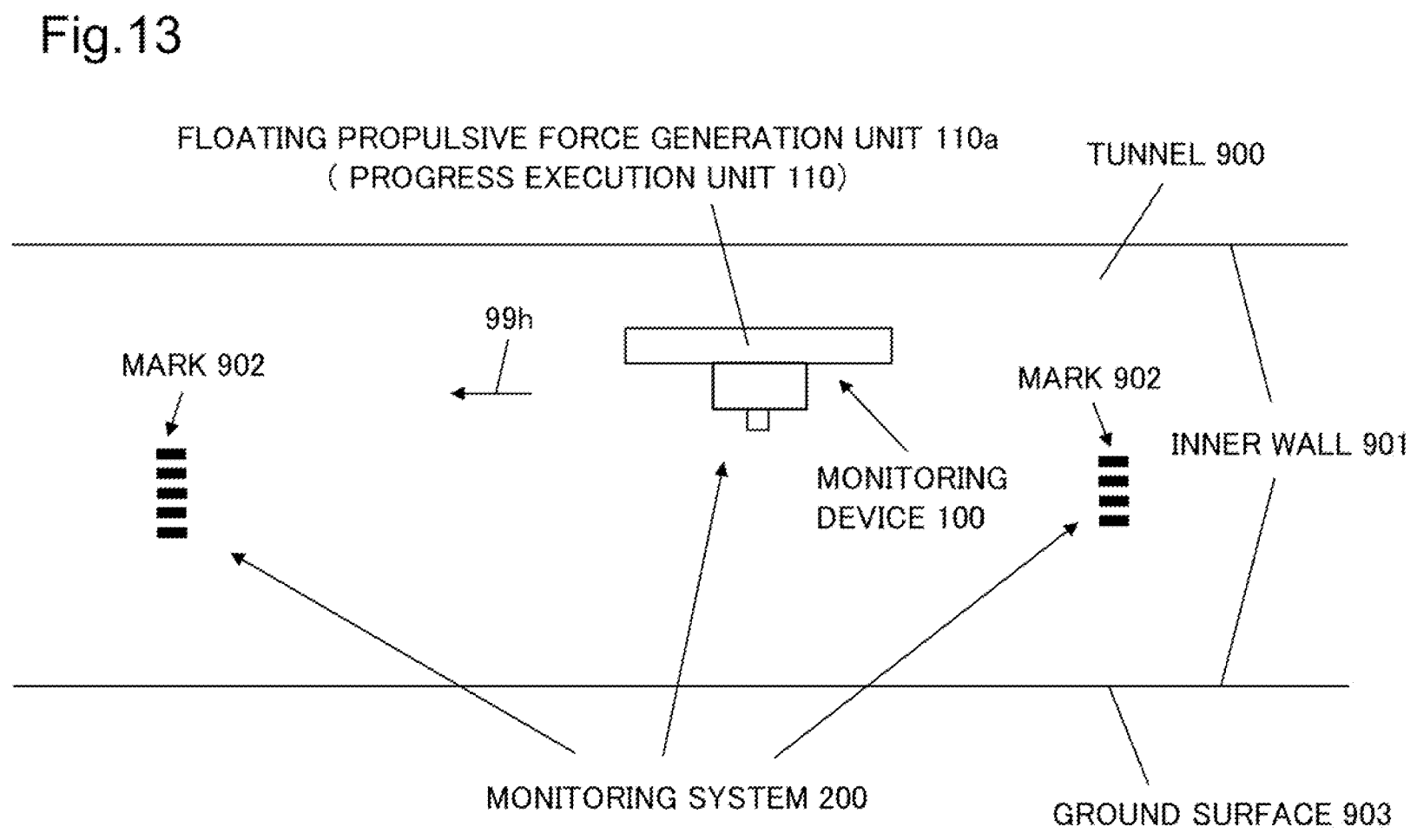

FIG. 13 is a schematic diagram illustrating an example of the monitoring system 200 according to the present example embodiment that includes the monitoring device 100 including the progress execution unit 110 (the floating propulsive force generation unit 110*a*) illustrated in FIG. 4. The monitoring device 100 in FIG. 13 searches for a suspicious section on the inner wall 901 while progressing in the direction indicated with the arrow 99*h* in an aerial flight. Alternatively, the monitoring device 100 in FIG. 13 progresses in the direction indicated with the arrow 99*h* in an aerial flight and then stops, thereby searching for a suspicious section on the inner wall 901.

Further, when the suspicious section is detected, the monitoring device 100 derives a distance (suspicious section distance) from the reference position such as an entrance of the tunnel 900 to the suspicious section, based on the mark 902, by the method similar to that in the case in FIG. 9. Then, the monitoring device 100 specifies the position of the suspicious section, based on the suspicious section distance and the rotation angle position relating to the rotation in the direction indicated with the arrow 99*e* in FIG. 3C.

Figure 14:
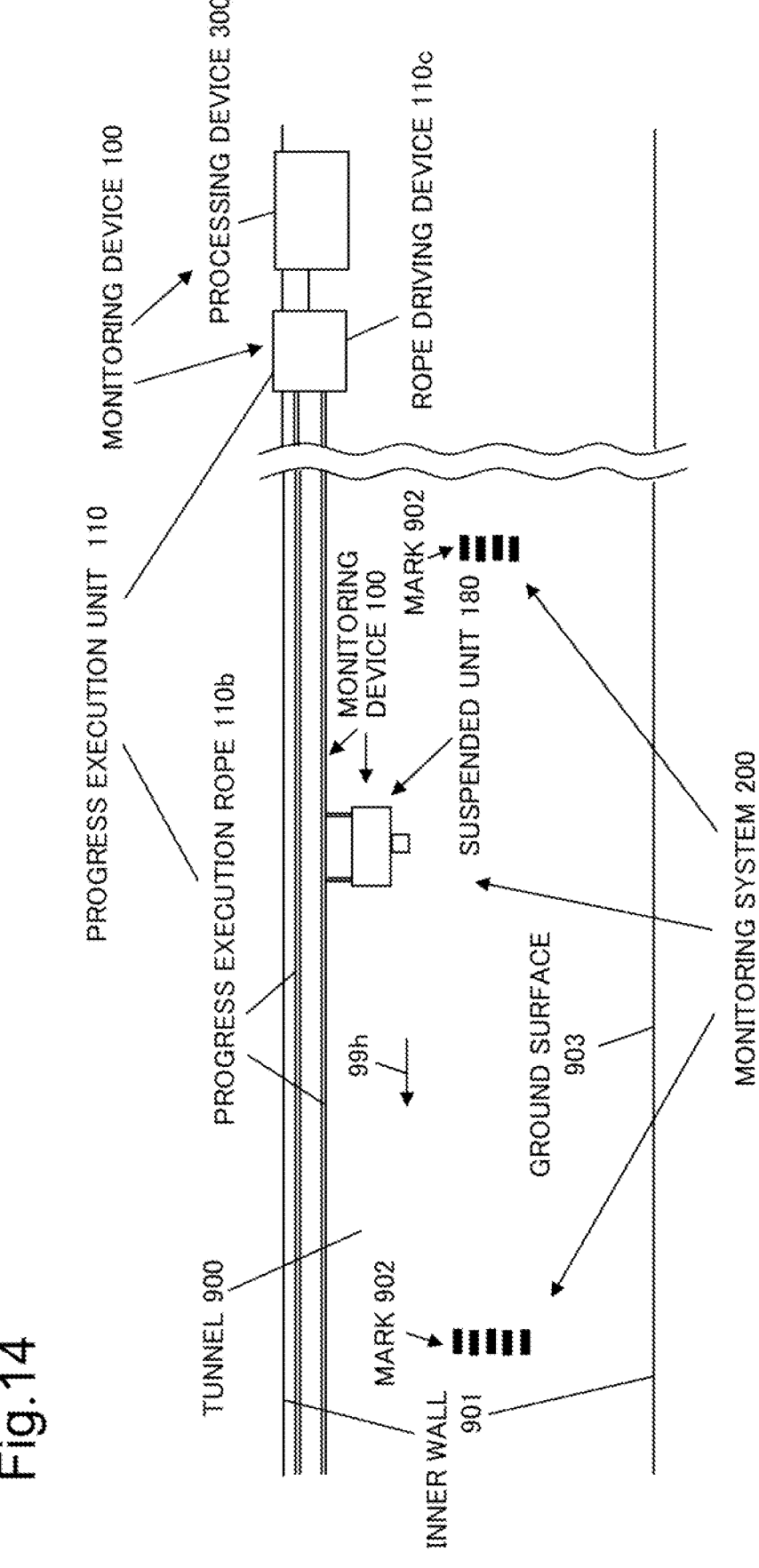
FIG. 14 is a schematic diagram illustrating a configuration example of a monitoring system including the monitoring device including a progress execution unit, which is illustrated in FIG. 5A.

FIG. 14 is a schematic diagram illustrating an example of the monitoring system 200 according to the present example embodiment that includes the monitoring device 100 including the progress execution unit 110 (the combination of the progress execution rope 110*b* and the rope driving device 110*c*) illustrated in FIG. 5A. A suspended unit 180 of the monitoring device 100 in FIG. 14 searches for a suspicious section on the inner wall 901 while the progress execution rope 110*b* on the lower side progresses in the direction indicated with the arrow 99*h*. Alternatively, the monitoring device 100 in FIG. 14 progresses in the direction indicated with the arrow 99*h* and then stops due to stoppage of the progress execution rope 110*b*, thereby searching for a suspicious section on the inner wall 901.

Further, when the suspicious section is detected, the monitoring device 100 derives a distance (suspicious section distance) from the reference position such as an entrance of the tunnel 900 to the suspicious section, based on the mark 902, by the method similar to that in the case in FIG. 9. Then, the monitoring device 100 specifies the position of the suspicious section, based on the suspicious section distance and the rotation angle position relating to the rotation in the direction indicated with the arrow 99*e* in FIG. 3B.

In the description for the above-mentioned monitoring system, there has been given an example in which projections and recesses form the mark on the tunnel inner wall. However, the mark may be indicated gradations of a color including black. In this case, the monitoring device specifies a suspicious section with gradations of a color of return light, and derives the position of the suspicious section, based on a mark similarly detected with gradations of the color.

EFFECTS

The monitoring device according to the second example embodiment includes a configuration similar to that of the monitoring device according to the first example embodiment, and first exerts effects similar to those exerted by the monitoring device according to the first example embodiment. In addition, the monitoring device according to the second example embodiment specifies the position of the suspicious section detected on the tunnel inner wall, based on the mark closer with respect to the reference position of the tunnel and having a distance from the reference position, which is accurately measured in advance. Therefore, the monitoring device according to the second example embodiment is capable of reducing a derivation error of a position of a suspicious section and specifying the position of the suspicious section with higher accuracy.

In the description of the second example embodiment given above, it is assumed that the monitoring device 100 is capable of observing the marks 902 being in the predetermined progress route. However, for example, monitoring from the progress route cannot be executed in some cases because an obstacle due to collapse or the like is present in the progress route. In such a case, an error occurs to the distance from the monitoring device 100 to the mark 902, which is acquired by the above-mentioned method, based on the angle position at which the mark 902 is irradiated with the laser pulse light. In this case, for example, the distance from the monitoring device 100 to the mark 902 can be derived based on the shape of the mark 902, which is acquired through irradiation with the laser pulse light, and the shape of the tunnel in the periphery of the mark 902.

Further, in the description of the above-mentioned example embodiment, there is given an example in which the monitoring device according to the example embodiment detects a suspicious section on the inner wall of the tunnel. However, the monitoring device may detect a suspicious section having abnormality on a road, a railroad track in a tunnel, and the like.

Moreover, the monitoring device according to the example embodiment may monitor a defect on an inner surface of a conduit such as water and sewage pipes, instead of a tunnel.

Further, in the description given above, there is given an example in which the directions of the laser pulse light and the return light thereof is rotated by rotating the element unit being a combination of the laser element and the light reception element. However, for example, by fixing the element unit, reflecting the emitted laser pulse light and the return light thereof on a mirror, and rotating the mirror, the directions of the laser pulse light and the return light thereof may be rotated.

Further, in the description given above, there is given an example of LiDAR technique in which the laser pulse light is mainly used as laser light with which a monitoring target is irradiated. However, the technique applied to the example embodiment may be other LiDAR techniques. Examples of such a LiDAR technique include a frequency modulation coherent LiDAR technique, which is publicly known.

Figure 15:
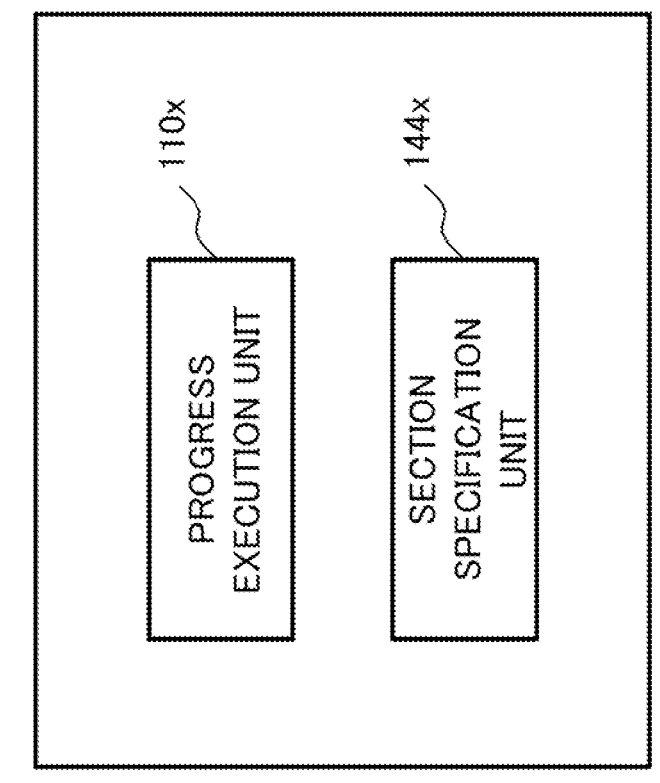
FIG. 15 is a schematic diagram illustrating a minimum configuration of the monitoring device according to the example embodiment.

FIG. 15 is a schematic diagram illustrating a configuration of a monitoring device $100x$, which is a minimum configuration of the monitoring device according to the example embodiment. The monitoring device $100x$ includes a progress execution unit $110x$ and a section specification unit $144x$.

The progress execution unit $110x$ causes a combination of an irradiation unit and a light reception unit to progress inside a space that is tubular inside, the irradiation unit irradiating, with laser light, an exposed object being an object exposed in the space of a tubular object being an object having the space, the light reception unit converting return light of the laser light from the exposed object into an electric signal.

The section specification unit $144x$ specifies, based on the electric signal, a predetermined-state section position being a position of a predetermined-state section being, among sections of the exposed object that are irradiated with the laser light, the section indicating a predetermined state, and outputs the resultant.

The monitoring device $100x$ is capable of progressing due to the progress execution unit $110x$, and hence it is possible to perform monitoring in such a way as to acquire a state of an exposed object on an inner wall or the like of the tubular object such as a tunnel and a conduit, without permanent installation therein.

Thus, with the above configuration, the monitoring device $100x$ exerts the effects described in the section of [Advantageous Effects].

Each of the example embodiments according to the present invention has been described above, but the present invention is not limited to the above-mentioned example embodiments, and further modifications, replacement, and adjustment can be added without departing from the basic technical idea of the present invention. For example, the configurations of the elements illustrated in each of the drawings are merely examples for assisting understanding of the present invention, and are not intended to provide limitations to those configurations illustrated in the drawings.

The whole or a part of the example embodiments described above can be described as, but not limited to, the following supplementary notes.

(Supplementary Note 1)

A monitoring device including:

a progress execution unit that causes a combination of an irradiation unit and a light reception unit to progress inside a space that is tubular inside, the irradiation unit irradiating, with laser light, an exposed object being an object to be exposed in the space of a tubular object that is an object having the space, the light reception unit converting return light of the laser light from the exposed object into an electric signal; and a section specification unit that specifies, based on the electric signal, a predetermined-state section position being a position of a predetermined-state section that is, among sections of the exposed object that are irradiated with the laser light, the section indicating a predetermined state, and outputs the resultant.

(Supplementary Note 2)

The monitoring device according to Supplementary Note 1, wherein the section specification unit executes the specification, based on difference information being information indicating a difference between an irradiation time of the laser light from the irradiation unit and a light reception time of the return light of the laser light at the light reception unit.

(Supplementary Note 3)

The monitoring device according to Supplementary Note 1, wherein the section specification unit executes the specification, based on information indicating intensity of the electric signal.

(Supplementary Note 4)

The monitoring device according to any one of Supplementary Notes 1 to 3, wherein the predetermined state is suspicion regarding abnormality.

(Supplementary Note 5)

The monitoring device according to any one of Supplementary Notes 1 to 4, wherein the output is three-dimensional display of the predetermined-state section position.

(Supplementary Note 6)

The monitoring device according to any one of Supplementary Notes 1 to 5, wherein the progress execution unit includes a wheel and a drive unit that drives the wheel.

(Supplementary Note 7)

The monitoring device according to Supplementary Note 6, wherein the space is provided with a defining object that defines a direction of the progress.

(Supplementary Note 8)

The monitoring device according to Supplementary Note 7, wherein the defining object is a railroad track.

(Supplementary Note 9)

The monitoring device according to any one of Supplementary Notes 1 to 5, wherein the progress execution unit includes a propeller and a drive unit that rotates the propeller.

(Supplementary Note 10)

The monitoring device according to any one of Supplementary Notes 1 to 5, wherein the progress execution unit includes a rope connected to the combination in the space and a drive unit that drives the rope in a direction of the progress.

(Supplementary Note 11)

The monitoring device according to any one of Supplementary Notes 1 to 10, wherein the specification is executed under a state in which the progress is stopped.

(Supplementary Note 12)

The monitoring device according to any one of Supplementary Notes 1 to 10, wherein the specification is executed during execution of the progress.

(Supplementary Note 13)

The monitoring device according to any one of Supplementary Notes 1 to 12, wherein the tubular object is a tunnel.

(Supplementary Note 14)

The monitoring device according to Supplementary Note 13, wherein the exposed object is at least any one of an inner wall of the tubular object, a road, and a railroad track.

(Supplementary Note 15)

The monitoring device according to any one of Supplementary Notes 1 to 12, wherein the tubular object is a conduit.

(Supplementary Note 16)

The monitoring device according to Supplementary Note 15, wherein the exposed object is an inner wall of the tubular object.

(Supplementary Note 17)

The monitoring device according to any one of Supplementary Notes 1 to 16, wherein a first distance derivation object is installed in the space, the first distance derivation object being an object for which a first distance being a distance indicating a length of a progress route relating to the progress from a reference position is derived, and the section specification unit derives the predetermined-state section position, based on the first distance derivation object.

(Supplementary Note 18)

The monitoring device according to Supplementary Note 17, wherein the section specification unit derives the position of the predetermined-state section, based on a third distance being a distance derived from the reference position to the predetermined-state section, based on a second distance and the first distance, the second distance being a distance between the first distance derivation object and the predetermined-state section.

(Supplementary Note 19)

The monitoring device according to Supplementary Note 18, wherein the section specification unit derives the second distance, based on a first rotation angle position and a second rotation angle position, the first rotation angle position being a rotation angle position relating to rotation of a first irradiation direction from the direction of the progress, the first irradiation direction being an irradiation direction that is a direction of the irradiation when the first distance derivation object is present in the irradiation direction, the second rotation angle position being a rotation angle position relating to rotation of a second irradiation direction from a direction of the progress, the second irradiation direction being the irradiation direction when the predetermined-state section is present in the irradiation direction.

(Supplementary Note 20)

The monitoring device according to Supplementary Note 18, wherein the section specification unit derives the second distance, based on a progress distance relating to the progress.

(Supplementary Note 21)

The monitoring device according to any one of Supplementary Notes 18 to 20, wherein the section specification unit derives the predetermined-state section position, based on the third distance and a third rotation angle position being a rotation angle position relating to rotation of an irradiation direction being a direction of the irradiation, the rotation being in a direction vertical to a direction of the progress.

(Supplementary Note 22)

The monitoring device according to any one of Supplementary Notes 17 to 21, wherein the first distance derivation object is a mark.

(Supplementary Note 23)

The monitoring device according to any one of Supplementary Notes 17 to 22, wherein the first distance derivation object is formed on the exposed object.

(Supplementary Note 24)

A monitoring system including:

the monitoring device according to any one of Supplementary Notes 17 to 23; and the first distance derivation object.

(Supplementary Note 25)

The monitoring system according to Supplementary Note 24, further including a plurality of the first distance derivation objects, wherein each of the first distance derivation objects has a different shape, and the section specification unit specifies the first distance of each of the first distance derivation objects, based on the shape.

(Supplementary Note 26)

A monitoring method including:

causing a combination of an irradiation unit and a light reception unit to progress inside a space that is tubular inside, the irradiation unit irradiating, with laser light, an exposed object being an object exposed in the space of a tubular object that is an object having the space, the light reception unit converting return light of the laser light from the exposed object into an electric signal; and specifying, based on the electric signal, a predetermined-state section position being a position of a predetermined-state section that is, among sections of the exposed object that are irradiated with the laser light, the section indicating a predetermined state and outputting the resultant.

(Supplementary Note 27)

A monitoring program causing a computer to execute:

processing of causing a combination of an irradiation unit and a light reception unit to progress inside a space that is tubular inside, the irradiation unit irradiating, with laser light, an exposed object being an object exposed in the space of a tubular object that is an object having the space, the light reception converting return light of the laser light from the exposed object into an electric signal; and processing of specifying, based on the electric signal, a predetermined-state section position being a position of a predetermined-state section that is, among sections of the exposed object that are irradiated with the laser light, the section indicating a predetermined state, and outputting the resultant.

Herein, the tubular object in the supplementary notes given above is, for example, the tunnel 900 in FIG. 9, FIG. 10, FIG. 11, FIG. 13, or FIG. 14 or a sewerage pipe that is not illustrated. Further, the exposed object is, for example, the inner wall 901 in FIG. 9, FIG. 10, FIG. 11, FIG. 13, or FIG. 14. Further, the laser light is, for example, the above-mentioned laser pulse light for irradiation in the direction indicated with the arrow 99c in FIGS. 3A, 3B, and 3C.

Further, the irradiation unit is, for example, the laser element of the element unit 132 in FIGS. 3A, 3B, and 3C. Further, the light reception unit is, for example, the light reception element of the element unit 132 in FIGS. 3A, 3B, and 3C. Further, the combination is, for example, the element unit 132 in FIGS. 3A, 3B, and 3C. Further, the progress is, for example, the progress in the direction indicated with the arrow 99*h* in FIG. 1, FIG. 4, FIG. 5A, FIG. 9, FIG. 13, or FIG. 14.

Further, the progress execution unit is, for example, the progress execution unit 110 in FIG. 1, FIG. 4, FIG. 5A. Further, the predetermined state is, for example, the suspicious state for abnormality described above. Further, the predetermined-state section is, for example, the suspicious section for abnormality described above. Further, the predetermined-state section position is, for example, the position of the suspicious section for abnormality described above. Further, the section specification unit is, for example, the suspicious section specification unit 144 in FIG. 7.

Further, the monitoring device is, for example, the monitoring device 100 in FIG. 1, FIG. 4, FIG. 5A, FIG. 6, FIG. 9, FIG. 13, or FIG. 14. Further, the difference information is, for example, the difference information described above. Further, the information indicating intensity is, for example, the information indicating intensity described above. Further, the progress execution unit in Supplementary Note 6 is, for example, the progress execution unit 110 in FIG. 1. Further, the progress execution unit in Supplementary Note 9 is, for example, the progress execution unit 110 (the floating propulsive force generation unit 110*a*) in FIG. 4.

Further, the progress execution unit in Supplementary Note 10 is, for example, the progress execution unit 110 in FIG. 5A. Further, the specification to be executed under a state the progress is stopped in Supplementary Note 11, or the specification to be executed during execution of the progress in Supplementary Note 12 is, for example, the processing in S103 in FIG. 8. Further, the tunnel is, for example, the tunnel 900 in FIG. 9, FIG. 10, FIG. 11, FIG. 13, or FIG. 14.

Further, the first distance derivation object is, for example, the mark 902 in FIG. 9, FIG. 10, FIG. 11, FIG. 13, or FIG. 14. Further, the first distance is, for example, the distance from the above-mentioned reference position (such as an entrance or an exit of a tunnel) to the mark 902 in FIG. 9, FIG. 10, FIG. 11, FIG. 13, or FIG. 14. Further, the first distance derivation object is, for example, the mark 902 in FIG. 9, FIG. 10, FIG. 11, FIG. 13, or FIG. 14.

Further, the second distance is, for example, the distance L₄ in FIG. 11. Further, the third distance is, for example, the distance from the above-mentioned reference position (such as an entrance or an exist of a tunnel) to the suspicious section 911 in FIG. 11.

Further, the first rotation angle position is, for example, the rotation angle position θ₁ in FIG. 11. Further, the second rotation angle position is, for example, the rotation angle position θ₂ in FIG. 11.

Further, the processing of deriving the second distance, based on the progress distance relating to the progress, is, for example, the processing executed by the method described in (a) First Method of Deriving Suspicious Section Distance, which is described above. Further, the third rotation angle position is, for example, the rotation angle position relating to the rotation in the direction indicated with the arrow 99*e* in FIG. 3B. Further, the mark is, for example, the mark 902 in FIG. 9, FIG. 10, FIG. 11, FIG. 13, or FIG. 14.

Further, the monitoring system is, for example, the monitoring system 200 in FIG. 9, FIG. 13, or FIG. 14. Further, the computer is, for example, a computer including the processing unit 140 and the storage unit 150 in FIG. 6. Further, the monitoring program is, for example, the program that causes the processing unit 140 in FIG. 6 to execute the processing and is stored in the storage unit 150.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-036329, filed on Mar. 4, 2020, the disclosure of which is incorporated herein in its entirety by reference.

REFERENCE SIGNS LIST

81*a*, 81*b* Member
99*a*, 99*b*, 99*c*, 99*d*, 99*e*, 99*g*, 99*h* Arrow
100, 100*x* Monitoring device
110, 110*x* Progress execution unit
110*a* Floating propulsive force generation unit
110*b* Progress execution rope
110*c* Rope driving device
111 Wheel
130 Acquisition unit
131*a* First drive unit
131*b* Second drive unit
132 Element unit
135*a* First shaft
135*b* Second shaft
136 Acquisition processing unit
138 Acquisition structure unit
140, 140*a* Processing unit
140*b* Processing device
141 Progress processing unit
142 Acquisition processing unit
144 Suspicious section specification unit
144*x* Section specification unit
150 Storage unit
160 Main body unit
170 Communication unit
180 Suspended unit
200 Monitoring system
900 Tunnel
901 Inner wall
902 Mark
903 Ground surface
911 Suspicious section

What is claimed is:

1. A monitoring device comprising:
a progress execution unit configured to cause a combination of an irradiation unit and a light reception unit to progress inside a space that is tubular inside, the irradiation unit being for irradiating, with laser light, an exposed object being an object exposed in the space of a tubular object that is an object having the space, the light reception unit being for converting return light of the laser light from the exposed object into an electric signal; and
a section specification unit configured to specify, based on the electric signal, a predetermined-state section position being a position of a predetermined-state section that is, among sections of the exposed object that are irradiated with the laser light, the section indicating a predetermined state, and output a resultant, wherein
the section specification unit is further configured to derive, as the predetermined-state section position, a distance of the predetermined-state section from a reference position, based on a mark installed in the space and a first distance indicating a length of a progress route relating to the progress from the reference position.

2. The monitoring device according to claim 1, wherein the section specification unit executes the specification, based on difference information indicating a difference between an irradiation time of the laser light from the irradiation unit and a light reception time of the return light of the laser light at the light reception unit.

3. The monitoring device according to claim 1, wherein the section specification unit executes the specification, based on information indicating intensity of the electric signal.

4. The monitoring device according to claim 1, wherein the predetermined state is suspicion regarding abnormality.

5. The monitoring device according to claim 1, wherein the output is three-dimensional display of the predetermined-state section position.

6. The monitoring device according to claim 1, wherein the progress execution unit includes a wheel and a drive unit configured to drive the wheel.

7. The monitoring device according to claim 6, wherein the space is provided with a defining object that defines a direction of the progress.

8. The monitoring device according to claim 7, wherein the defining object is a railroad track.

9. The monitoring device according to claim 1, wherein the progress execution unit includes a propeller and a drive unit configured to rotate the propeller.

10. The monitoring device according to claim 1, wherein the progress execution unit includes a rope connected to the combination in the space and a drive unit configured to drive the rope in a direction of the progress.

11. The monitoring device according to claim 1, wherein the section specification unit is further configured to, in the specification, when the progress is stopped, change an irradiation direction of the laser light in two different rotation directions, and when the progress is being executed, change the irradiation direction in one of the two rotation directions while maintaining the other rotation direction of the irradiation direction of the laser light constant.

12. The monitoring device according to claim 1, wherein the tubular object is a tunnel.

13. The monitoring device according to claim 12, wherein the exposed object is at least any one of an inner wall of the tubular object, a road, and a railroad track.

14. The monitoring device according to claim 1, wherein the tubular object is a conduit.

15. The monitoring device according to claim 14, wherein the exposed object is an inner wall of the tubular object.

16. The monitoring device according to claim 1, wherein the mark has a shape different from other marks, and the section specification unit is further configured to specify the first distance of the mark based on the shape.

17. The monitoring device according to claim 1, wherein The mark has a predetermined projection-recess pattern.

18. The monitoring device according to claim 1, wherein the section specification unit is configured to derive the position of the predetermined-state section, based on a third distance being derived from the reference position to the predetermined-state section, based on a second distance and the first distance, the second distance being a distance between the mark and the predetermined-state section.

19. A monitoring system comprising:
a monitoring device; and
a mark, wherein
the monitoring device includes
    a progress execution unit configured to cause a combination of an irradiation unit and a light reception unit to progress inside a space that is tubular inside, the irradiation unit being for irradiating, with laser light, an exposed object being an object exposed in the space of a tubular object that is an object having the space, the light reception unit being for converting return light of the laser light from the exposed object into an electric signal; and
    a section specification unit configured to specify, based on the electric signal, a predetermined-state section position being a position of a predetermined-state section that is, among sections of the exposed object that are irradiated with the laser light, the section indicating a predetermined state, and output a resultant, and wherein
the mark is installed in the space, the mark being an object for which a first distance being a distance indicating a length of a progress route relating to the progress from a reference position is derived, and
the section specification unit is further configured to derive, as the predetermined-state section position, a distance of the predetermined-state section from the reference position based on the mark.

20. A monitoring method comprising:
causing a combination of an irradiation unit and a light reception unit to progress inside a space that is tubular inside, the irradiation unit being for irradiating, with laser light, an exposed object being exposed in the space of a tubular object that is an object having the space, the light reception unit being for converting return light of the laser light from the exposed object into an electric signal; and
specifying, based on the electric signal, a predetermined-state section position being a position of a predetermined-state section that is, among sections of the exposed object that are irradiated with the laser light, the section indicating a predetermined state, and outputting a resultant, wherein
a distance of the predetermined-state section from a reference position is derived as the predetermined-state section position, based on a mark installed in the space and indicating a first indicating a length of a progress route relating to the progress from the reference position.

* * * * *